United States Patent
Wojcik

(10) Patent No.: US 9,716,401 B2
(45) Date of Patent: Jul. 25, 2017

(54) RECHAREGABLE BATTERY PACK

(71) Applicant: Otter Products, LLC, Fort Collins, CO (US)

(72) Inventor: James J. Wojcik, Kirkland, WA (US)

(73) Assignee: Otter Products, LLC, Fort COllins, CO (US)

( * ) Notice: Subject to any disclaimer, the term of this patent is extended or adjusted under 35 U.S.C. 154(b) by 321 days.

(21) Appl. No.: 14/589,786

(22) Filed: Jan. 5, 2015

(65) Prior Publication Data

US 2015/0194839 A1    Jul. 9, 2015

Related U.S. Application Data

(60) Provisional application No. 61/923,840, filed on Jan. 6, 2014.

(51) Int. Cl.
| | |
|---|---|
| *H02J 7/00* | (2006.01) |
| *H02J 7/02* | (2016.01) |
| *H01M 10/46* | (2006.01) |
| *H01M 2/10* | (2006.01) |
| *H01M 10/42* | (2006.01) |
| *H04Q 11/00* | (2006.01) |
| *H02J 50/12* | (2016.01) |

(52) U.S. Cl.
CPC ........... *H02J 7/025* (2013.01); *H01M 2/1094* (2013.01); *H01M 10/425* (2013.01); *H01M 10/46* (2013.01); *H02J 50/12* (2016.02); *H04Q 11/00* (2013.01); *H02J 7/0042* (2013.01); *H02J 7/0047* (2013.01); *H02J 2007/005* (2013.01); *H02J 2007/0049* (2013.01)

(58) Field of Classification Search
USPC ........................................................ 320/108
See application file for complete search history.

(56) References Cited

U.S. PATENT DOCUMENTS

| | | |
|---|---|---|
| 5,959,433 A | 9/1999 | Rohde |
| 7,375,493 B2 | 5/2008 | Calhoon et al. |
| 7,948,209 B2 | 5/2011 | Jung |
| 2007/0103110 A1* | 5/2007 | Sagoo ............... H02J 7/025 320/109 |
| 2011/0023130 A1 | 1/2011 | Gudgel et al. |
| 2011/0115430 A1* | 5/2011 | Saunamaki ......... H02J 5/005 320/108 |
| 2011/0140541 A1 | 6/2011 | Ryu et al. |
| 2011/0205124 A1 | 8/2011 | Shelef |
| 2012/0217971 A1 | 8/2012 | DeLuca |
| 2013/0198867 A1* | 8/2013 | Ricci ............ G06F 13/4081 726/29 |
| 2013/0225082 A1* | 8/2013 | Kang ............... H02J 7/025 320/108 |

(Continued)

*Primary Examiner* — Robert Grant

(57) ABSTRACT

A rechargeable battery pack includes a housing, a rechargeable battery, a first inductive coil, a second inductive coil, and electrical circuitry. The first inductive coil is proximate a first surface of the housing and configured for wirelessly receiving electrical power from an external power source. The electrical circuitry stores the received electrical power in the rechargeable battery. The second inductive coil is proximate a second surface of the housing. The second inductive coil is configured for wirelessly transmitting at least a portion of the received electrical power stored in the rechargeable battery to the electronic device.

18 Claims, 17 Drawing Sheets

(56) References Cited

U.S. PATENT DOCUMENTS

2013/0278207 A1* 10/2013 Yoo .................... H02J 7/025
  320/108
2013/0335014 A1  12/2013 Ashinghurst et al.

* cited by examiner

RECHAREGABLE BATTERY PACK

CROSS REFERENCE TO RELATED APPLICATIONS

This application claims priority to U.S. Provisional Patent Application 61/923,840 filed Jan. 6, 2014, the content of which is incorporated by reference herein in its entirety.

FIELD

This application relates to rechargeable battery backs for charging and/or powering electronic devices.

BACKGROUND

Portable electronic devices, including at least cell phones, smart phones, personal digital assistants (PDAs), tablet computers, laptop computers, phablets (phone/tablets), gaming devices, global positioning satellite (GPS) receivers, and multimedia players (such as iPods, mp3 players, video players, and the like) typically operate using one or more batteries. In many cases, these batteries are rechargeable. These types of devices are often used in mobile or remote fashions and battery life can often be an issue. In addition, over time, increased processing power and new features included in electronic devices often cause battery power to be consumed at an even higher rate than earlier devices. Consequently, battery life and access to a power source for recharging the batteries often become issues when using these types of devices. It is expected that the demands placed on battery operated devices will continue to grow.

Manufacturers have developed portable power sources (e.g., portable batteries and battery packs) that can be transported for convenient access when needed to power or recharge electronic devices. However, conventional portable power sources are lacking in certain features which can make their use more convenient, effective, and/or efficient. Conventional cable interfaces to battery packs may be inconvenient in some circumstances for reasons such as: a need to remember carry the cable along with the battery pack, the inconvenience of storing the cable and keeping it untangled and/or the need to attach the cable to both devices when charging of the battery pack or the electronic device is desired. However, in other circumstances cable connections still provide certain benefits and improved cables and cable connection methods for battery packs are needed.

SUMMARY

A rechargeable battery pack with improved features is disclosed herein. In one implementation, the rechargeable battery pack includes a housing, a rechargeable battery, a first inductive coil, a second inductive coil, and electrical circuitry. The first inductive coil is proximate a first surface of the housing and configured for wirelessly receiving electrical power from an external power source. The electrical circuitry stores the received electrical power in the rechargeable battery of the battery pack. The second inductive coil is proximate a second surface of the housing. The second inductive coil is configured for wirelessly transmitting at least a portion of the received electrical power stored in the rechargeable battery to the electronic device.

Beneficially, the rechargeable battery pack described above can be charged wirelessly without a cable and can also be used to wirelessly recharge an electronic device, such as a smartphone. Eliminating the requirement of a cable from the charging and/or discharging of the battery pack makes the processes easier for the user and may eliminate the need to carry a cable along with the battery pack. In addition, eliminating electrical connectors on the battery pack also makes the battery pack more resilient to damage and can reduce chances that it could be damaged by water, snow, rain, dust, dirt, or a contaminant or damaging element of another type. A lack of connectors or cables can also make the rechargeable battery pack more compact, more aesthetically pleasing, and/or expand packaging options for the battery pack.

While there are benefits to eliminating cables as discussed above, cables may still be useful in some circumstances and improved cables and cable management methods are also disclosed herein. In some configurations, a battery pack may include both the wireless charging/discharging capabilities discussed herein as well as one or more of the cable improvements disclosed herein.

Other improvements disclosed herein involve additional battery pack features as well as improved communication methods between battery packs and other devices. Various improvements are disclosed herein in the form of apparatuses, devices, components, systems, and methods. In some situations, improvements may include features implemented as non-transitory machine-executable computer instructions that may be executed by one or more computer processors to perform one or more of the improvements disclosed herein.

While many of the examples herein are discussed with respect to a "battery" pack, it should be understood that the techniques, improvements, apparatuses, systems, and methods provided herein are equally applicable to power packs or portable energy storage devices utilizing other methods of power storage including: fuel cells, lithium titanate cells, capacitive energy storage devices, super capacitors, kinetic energy storage devices, thermal energy storage devices, and/or combinations thereof. The claims are not to be limited to any particular type of energy storage device.

BRIEF DESCRIPTIONS OF DRAWINGS

DETAILED DESCRIPTION

Figure 1:
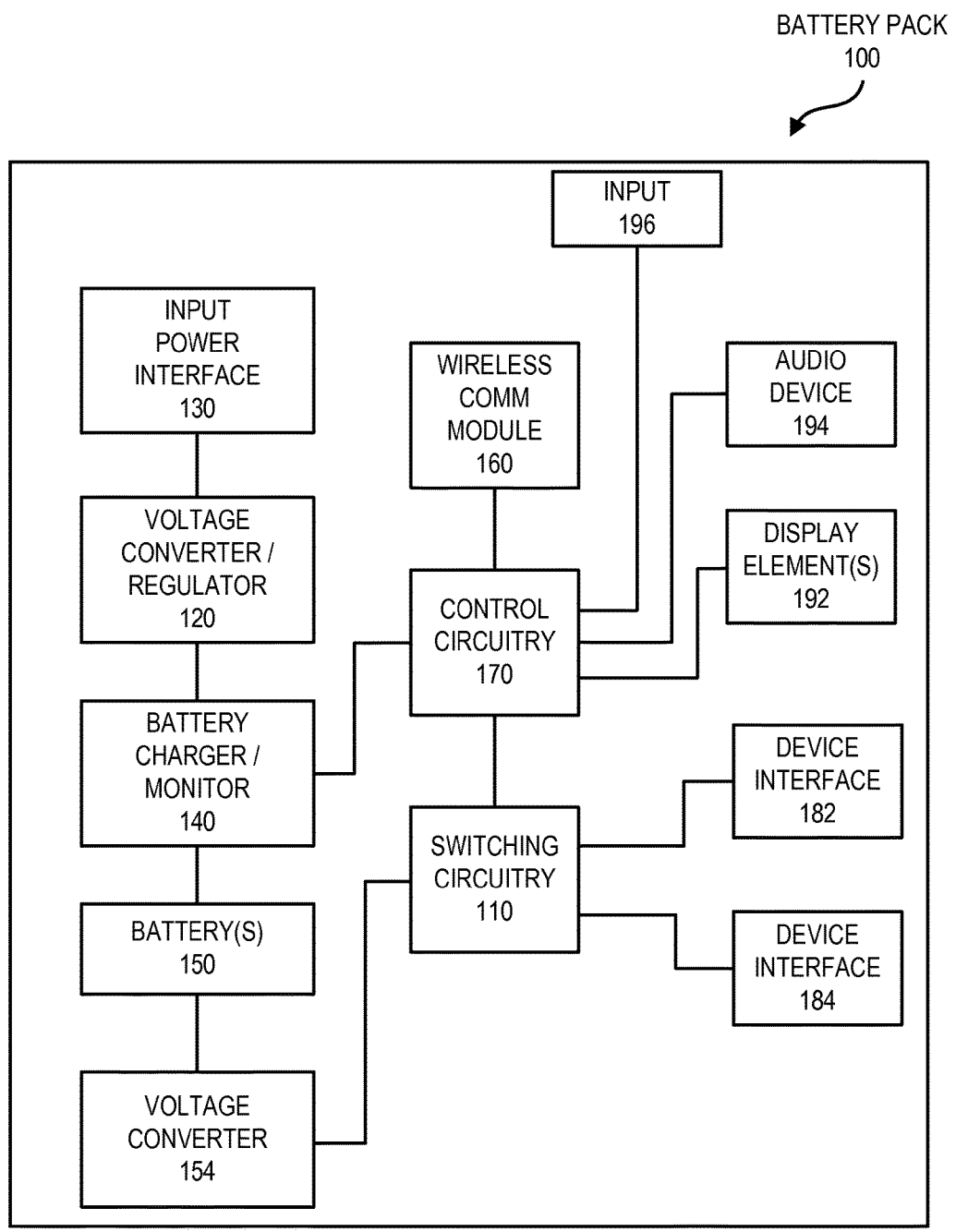
FIG. 1 illustrates a block diagram of a battery pack in accordance with the techniques introduced herein.

FIG. 1 illustrates a block diagram of a battery pack 100 in accordance with the apparatuses, techniques, and methods introduced herein. Battery pack 100 includes input power interface 130, voltage converter/regulator 120, battery charger/monitor 140, battery(s) 150, voltage converter 154, wireless communication module 160, control circuitry 170, switching circuitry 110, audio device 194, display element(s) 192, input 196, device interface 182, and device interface 184.

Input power interface 130 includes any electromechanical device or interface for receiving power from an external source, such as from a 120 volt alternating current (VAC) or 240 VAC power source. Input power interface 130 may include any type of jack, plug, or electromechanical connector for receiving electrical power into battery pack 100. In some configurations, input power interface 130 may include a flexible electrical cord with a plug or connector attached to the end of the flexible electrical cord for purposes of attaching to an electrical power source. In other cases, input power interface 130 may include an electromechanical interface affixed to a case or housing of battery pack 100 for receiving a plug or jack associated with an electrical power source. In yet other cases, input power interface 130 may include one or more rigid electrical prongs or electrical contacts for plugging into an electrical outlet associated with an electrical power source. In the latter example, the rigid electrical prongs or contacts may pivot, rotate, retract, or fold into the case or housing of battery pack 100 for stowage when not in use.

Voltage converter/regulator 120 includes any device or combination of devices for converting input power received from input power interface 130 to a different voltage and/or converting input power received from input power interface 130 to vary another characteristic of the received input power. For example, voltage converter/regulator 120 may convert received 120 VAC or 240 VAC power to a lower voltage such as to 5 volts or 12 volts. Many other input and output voltage combinations are possible. In addition, voltage converter/regulator 120 may also convert incoming alternating current (AC) to direct current (DC). Voltage converter/regulator 120 may also perform other power related functions including power conditioning, current limiting, spike protection, surge protection, and/or the like.

Battery(s) 150 comprises one or more batteries for supplying power to one or more devices to which battery pack 100 may be attached. Battery(s) 150 may comprise one or more of a variety of electrical power storage technologies including lithium ion (Li-ion), lithium ion polymer (Li-ion polymer), lead-acid, nickel cadmium (NiCd), nickel metal hydride (NiMH), nickel-zinc, alkaline, fuel cells, lithium titanate cells, capacitive energy storage devices, super capacitors, and/or any other type of device for storing energy. While the term "battery" is primarily used herein for purposes of explanation, the apparatuses, methods, systems, and techniques described herein are applicable for use with any power or energy storage technology. The apparatuses, methods, and techniques described herein are not to be limited to any particular energy storage technology.

Battery(s) 150 store energy, in some cases chemically, which can be converted into electrical energy and can be provided to an electronic device to which battery pack 100 is attached or otherwise interfaced. In some configurations, some or all of battery(s) 150 may not be contained within battery pack 100 and battery pack 100 may contain an interface to connect to one or more separate or external batteries or other power sources similar to battery(s) 150. In addition, battery(s) 150 may be swappable or replaceable out of battery pack 100 by an end user of battery pack 100.

Battery charger/monitor 140 includes any device or combination of devices for charging battery(s) 150 using current received from voltage converter/regulator 120. Battery charger/monitor 140 may charge battery(s) 150 by transitioning through multiple charging phases such as conditioning, constant current, and/or constant voltage. Control circuitry 170 may provide inputs to and/or control battery charger/monitor 140 by setting a mode of battery charger/monitor 140, supplying charging characteristics, and/or providing other information related to the charging of battery(s) 150. Control circuitry 170 may also monitor the status of charging and/or charge activities through communication with battery charger/monitor 140. Battery charger/monitor 140 may be capable of charging battery(s) 150 using different charging techniques or algorithms (e.g., fast charge, slow charge, etc.).

Battery charger/monitor 140 may perform thermal management functions with respect to the charging activities and/or may monitor other conditions or use parameters of battery(s) 150. For example, battery charger/monitor 150 may also provide fuel gauge functions with respect to battery(s) 150. Battery charger/monitor 140 may use one or more known algorithms for fuel gauging and may provide information related to various parameters such as remaining battery capacity, present rate-of-use, state-of-charge (e.g., percentage remaining), run-time to empty, battery voltage, and/or battery temperature. Battery charger/monitor 140 may be configured for or commanded to provide some or all of these types of information to control circuitry 170. In addition, battery charger/monitor 140 may be capable of being configured for or commanded to these different modes by control circuitry 170.

Voltage converter 154 includes one or more devices for adjusting the voltage of power supplied by battery(s) 150. In one example, battery(s) 150 includes one or more batteries having a nominal voltage of 3.7 volts (3.7V). However, other devices and/or components of battery pack 100 may be configured to receive power at 5 volts (5V). In addition, some common interfaces (e.g., USB) are specified to provide power at 5V. Even though an electronic device powered by battery pack 100 may also utilize a 3.7V battery, power provided by battery pack 100 may need to be stepped up to 5V by voltage converter 154 because 5V is expected at an external interface or connector of the electronic device. Many other combinations of voltages are possible. In addition to adjusting the voltage of power output by battery(s) 150, voltage converter 154 may also perform other power related functions such as power conditioning, current limiting, spike protection, and/or surge protection.

Control circuitry 170 may include one or more devices for controlling various elements of battery pack 100 and/or for performing processing functions. Control circuitry 170 may include any type of microcontroller, microprocessor, microcomputer, programmable logic device, reconfigurable circuit, digital signal processor, or application specific circuit that is configured to communicate with other elements of battery pack 100 and/or to perform power management functions associated with battery pack 100. In some circumstances, these power management functions may be described as 'intelligent' power management functions.

In some configurations, control circuitry 170 may also communicate with one or more electronic devices which battery pack 100 is attached to. Control circuitry 170 may also communicate with an external power source, communicate with other devices, and/or may communicate with combinations of other devices or systems. Control circuitry 170 may make use of software, firmware, and/or another type of non-transitory computer executable program instructions stored in control circuitry 170. Alternately, the software, firmware, and/or computer executable program instructions may be stored in a separate memory device (not pictured).

Device interface 182 and/or device interface 184 may include electromechanical connectors for connecting battery pack 100 to one or more electronic devices. For example, device interface 182 and device interface 184 may each include a USB connector, a mini USB connector, a micro USB connector, an APPLE LIGHTNING connector, and/or any other type of electromechanical connector configured to conduct power and/or facilitate data communications between battery pack 100 and an electronic device. Device interface 182 and device interface 184 may include the same type of interface as each other or may comprise different types of interfaces, with respect to each other. Battery pack 100 may include more or fewer than two devices interfaces. The apparatuses, techniques, and methods disclosed herein are not to be limited to any particular number or type of device interface.

Switching circuitry 110 includes one or more devices for limiting or controlling delivery of electrical power from voltage converter 154 to one or more electronic devices attached to device interface 182 and/or device interface 184. Switching circuitry 110 may be controlled by control circuitry 170. In some configurations, switching circuitry 110 may control the electrical power only in terms of switching it on or off. In other configurations, switching circuitry 110 may be capable of further controlling the electrical power by limiting the amount of current available to the attached electronic device(s). In yet other cases, battery pack 100 may not include switching circuitry 110 and a direct electrical connection may exist between voltage converter 154 and device interface 182 and/or device interface 184.

Wireless communication module 160 includes any device or combination of devices for enabling wireless communication between battery pack 100 and one or more electronic devices. Wireless communication module 160 may be compatible with one or more wireless communication standards, or industry standards, such as WIFI, BLUETOOTH, BLUETOOTH LOW ENERGY, NFC, ZIGBEE, and/or any other wireless communication standard, such as a cellular wireless communication standard. Wireless communication module 160 may also conduct wireless communications with an electronic device using optical or infrared communication methods. Wireless communication module 160 may be capable of supporting simplex, half duplex, and/or full duplex communication. Wireless communication module 160 may include components such as a modulator, a demodulator, an rf transmitter, an rf receiver, an antenna, a filter, a mixer, an amplifier, a microprocessor, and/or a digital signal processor.

Display element(s) 192 comprise one or more devices for visually conveying information to a user of battery pack 100. Display element(s) 192 may include one or more of: a light emitting diode (LED), an organic light emitting diode (OLED), a liquid crystal display (LCD), electronic paper, electrophoretic ink, and/or another type of device for visually conveying information to a user, including combinations thereof. Display element(s) 192 may be made up of a group of discrete display elements, such as a group of LEDs. Display element(s) 192 may also be made up of a single display device, such as an LCD, containing a plurality of display elements or segments.

Audio device 194 comprises one or more devices for generating an audible signal. Audio device 194 may include a speaker, a buzzer, a beeper, a piezoelectric device, and/or a combination thereof.

In some configurations, battery pack 100 may also include a mechanical vibration device (not pictured). The mechanical vibration device may be used in place of or in addition to audio device 194 for gaining the attention of a user of battery pack 100 using haptic techniques. In addition, the mechanical vibration device may be used for other notification purposes where an audible or visual indication may not be desired or preferred.

Input 196 includes one or more devices through which a user may provide input to battery pack 100. Input 196 may include a switch, a group of switches, a button, a group of buttons, an optical detector, a touch sensitive device, or a combination thereof. Input 196 may be used to switch battery pack 100 on, to switch battery pack 100 off, to change an operational mode of battery pack 100, to select a feature of battery pack 100, to deselect a feature of battery pack 100, or a combination thereof.

Figure 2:
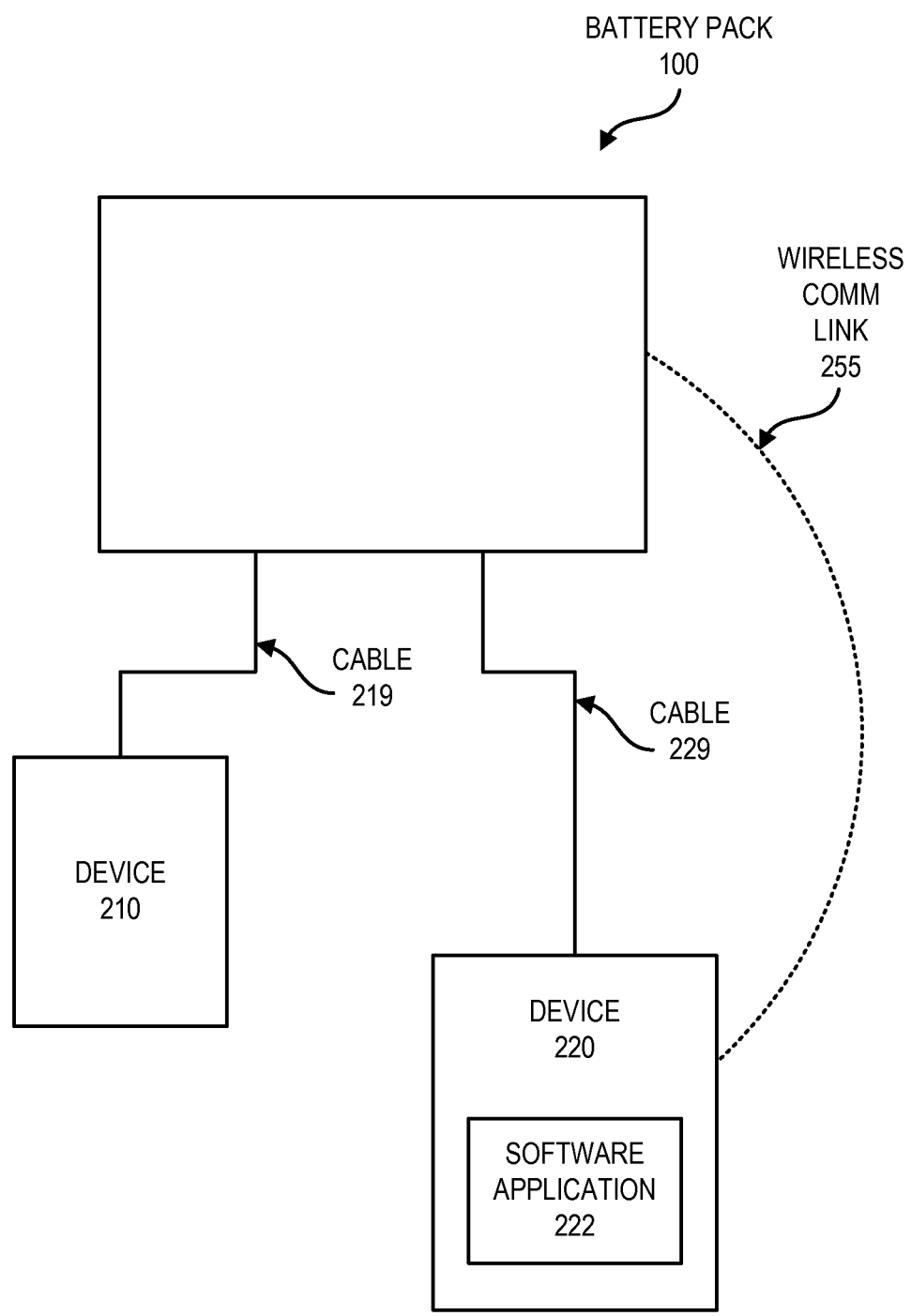
FIG. 2 illustrates operation of a battery pack in accordance with the techniques introduced herein.

FIG. 2 illustrates operation of battery pack 100 in accordance with the techniques and methods introduced herein. In FIG. 2, battery pack 100 is connected to device 210 and device 220. Each of device 210 and device 220 may be a cell phone, smart phone, PDA, tablet computer, phablet, laptop computer, gaming device, GPS receiver, two way radio, multimedia player, music player, mp3 player, video player, and/or another battery powered electronic device, including combinations thereof. Battery pack 100 is connected to device 210 and device 220 with cables or electrical conductors for purposes of providing electrical power from one or more batteries of battery pack 100 to device 210 and device 220. A user of mobile electronic devices may carry battery pack 100 in a briefcase, backpack, computer bag, tool box, pocket, suitcase, or car and use it when needed to recharge or operate one or more electronic devices. Cable 219 and/or cable 229 may be permanently attached to battery pack 100, may be permanently attached to one of the electronic devices, or may be removably connected to battery pack 100 and the electronic devices.

In addition to providing electrical power to an electrical or electronic device, a cable, such as cable 219, may be used to conduct communications between battery pack 100 and device 210. Communications between device 210 and battery pack 100 may include communicating information such as: a request to provide charging current, battery information, charging requirements, current requirements, a device status, a battery status, a requested charging profile, a request for information associated with battery pack 100, and/or other information related to supplying power to device 210, including combinations thereof. Communications between battery pack 100 to device 210 may include information such as: available power information, battery pack information, a request for information associated with device 210, and/or other information related to battery pack 100 or device 210, including combinations thereof.

In some cases, communications between battery pack 100 and device 210 may be conducted over a different cable and/or through different electromechanical connectors than are used to conduct power from battery pack 100 to device 210. In one example, a USB cable is used to conduct electrical power from battery pack 100 to device 210 while a different cable and/or connection is used to support communications between battery pack 100 and device 210.

Continuing with FIG. 2, device 220 is attached to and receives power from battery pack 100 through cable 229. In addition, a wireless communication link 255 is established between device 220 and wireless communication module 160 of battery pack 100. Wireless communication link 255 may comprise data communications conducted in accordance with one or more wireless communication standards such as WIFI, BLUETOOTH, BLUETOOTH LOW ENERGY, NFC, ZIGBEE, a cellular wireless communication standard, an optical communication standard, an infrared data communication standard, and/or a proprietary data communication standard. Wireless communication link 255 may be used by battery pack 100 to communicate with multiple devices.

Beneficially, device 220 may receive electrical power from battery pack 100 through cable 229 while exchanging information with battery pack 100 through wireless communication link 255. Exchanging communications over wireless communication link 255 rather than over cable 229 may offer a number of benefits including: simplified electromechanical interfaces on battery pack 100 and/or device 220, a simplified cable 229, elimination or reduction of any license fees associated with the electromechanical interfaces, reducing interference with data communications cause by transmission of electrical power, and/or an ability for device 220 to communicate with battery pack 100 when cable 229 is not connected. In some configurations, device 220 may request and receive the charge status of battery pack 100 without having to connect device 220 to battery pack 100. Similarly, battery pack 100 may request and receive information from device 220 without cable 229 being connected and/or before cable 229 is connected. In this way, cable 229 may be used only for conducting the electrical power from battery pack 100 to device 220 and not for communication between the devices.

In some configurations, wireless communication link 255 may include communications conducted through one or more other networks or devices such as a router, a server, a cellular network, a WiFi access point, a local area network, a wide area network, and/or the Internet. In one example, wireless communication module 160 includes a WiFi transceiver that communicates with a WiFi access point. Communications are routed from device 220 over a network and to battery pack 100 through the WiFi access point and the WiFi transceiver.

Wireless communication link 255 may also enable additional features of battery pack 100. In one example, battery pack 100 may be capable of emitting an audible signal using audio device 194 for purposes of assisting a user in locating battery pack 100 if it is lost or misplaced. This audible signal may be requested or initiated by a user of device 220 using device 220. This type of audible "find me" request may be communicated from device 220 to battery pack 100 over wireless communication link 255 in order to help the user find battery pack 100. This distance over which this function may be operational depends, at least in part, on the format, type, and/or power of the wireless communication signal used for wireless communication link 255.

In another example of a location feature, device 220 may keep track of its location when it is in communication with battery pack 100 in order to provide a last known location of battery pack 100 if battery pack 100 is lost or misplaced. Device 220 may obtain this location information using a GPS receiver, using triangulation, using information from a cellular network, using information from another network, or using another technique, including combinations thereof. Although a user may have not used battery pack 100 for several hours, days, weeks, or months and may not remember where it was used last, device 220 may report its approximate location when it was last in communication with battery pack 100. This may be particularly useful when wireless communication link 255 utilizes a relatively short range communication method such as BLUETOOTH, BLE, or NFC. Although battery pack 100 may have been moved since the last communication between the devices occurred, the user can significantly increase his or her chances of finding battery pack 100 by looking at or near this "last known location" reported by device 220. For example, the user may have traveled to four different cities over the course of a week and device 220 may report that the last time it was in communication with battery pack 100 was at or near the user's office in Atlanta. Device 220 may also record the time and date of the last communication between the devices to further assist in locating battery pack 100.

A software application, such as software application 222, may be stored and executed on device 220 for purposes of implementing one or more of the features or functions described herein. The software application (or "app") may include non-transitory computer processor instructions executable on one or more computer processors of device 220. Software application 222 may facilitate communication between device 220 and battery pack 100, including establishing wireless communication link 255 between device 220 and battery pack 100.

Software application 222 may also include other functions such as: displaying information to a user about a status of battery pack 100, displaying a current charge level of battery pack 100, displaying information to a user about a status of a battery of device 220, displaying charge rate information, displaying charge progress information, displaying an expected time when charging will be complete, receiving a password or security information to permit communication with battery pack 100, aiding a person in finding a misplaced battery pack, providing an interface to request the battery pack 100 "find me" feature described above, and/or a combination thereof. Software application 222, or a portion of software application 222, may be loaded on device 220 from a software application website, from an app store, from a remote server, via the Internet, and/or from battery pack 100. Software application 222 may also be updated using information received from a software application website, from an app store, from a remote server, via the Internet, and/or from battery pack 100.

Software application 222 may also perform other functions related to battery pack 100 such as diagnosing a problem of battery pack 100, updating firmware of battery pack 100, determining a condition of battery pack 100, and/or reporting a condition of battery pack 100. In the case of a firmware update, device 220 may be used to obtain the firmware update from another location, such as a website or remote server, and to transmit that firmware update to battery pack 100.

Software application 222 may also be used to set or change user selectable features of battery pack 100. A user may be able to set preferred charging profiles for specific electronic devices and/or set charging priorities among the devices. A user may be able to indicate that device 210 is permitted to consume as much power as is it is able to consume when it is the only device attached to battery pack 100, but give it a lower priority when device 220 is also connected to battery pack 100. In this example, device 210 may be limited to a lesser amount of power when device 220 is connected or may be limited to only a remainder amount of power available, if any, when device 220 is also connected to battery 100. Many other types of user selectable or configurable charging modes, charging preferences, or charging profiles are possible. In some configurations, different modes or preferences may be used for different devices. Battery pack 100 may detect different devices and utilize different modes or preferences accordingly.

In some configurations, device 220 may request a status of battery pack 100. For example, device 220 may request battery pack 100 to report its approximate charge status. Charge status may be reported as a percentage of full charge, an approximate number of available ampere-hours of available charge, an approximate number of watts of power available, an expected period of time for which battery pack 100 can supply power at the current use level, an approximate number of charge cycles remaining, and/or a combination thereof. Battery pack 100 may report this information to device 220 over cable 229, over wireless communication link 255, or both. In addition to reporting status or other information in response to a request from device 210 or device 220, battery pack 100 may also report status or other information in an unsolicited manner. For example, without receiving a specific request from device 210 or device 220, battery pack 100 may report a status to device 210, device 220, or to another device. This type of unsolicited reporting may occur in response to key events such as battery pack 100 reaching import charge levels (e.g., reaching 100% charge capacity, being discharged to 10% capacity, being discharged to 5% capacity, being discharged to 0% capacity, experiencing a fault condition, overheating, and/or other similar events).

In some cases, an electronic device, such as device 220, may be capable of communicating with and/or distinguishing among multiple battery packs, such as battery pack 100. A single electronic device may be capable of communicating with multiple battery packs using one or more wireless communication links, such as wireless communication link 255. In addition to monitoring the charge level of multiple battery packs, device 220 may also perform the other functions described herein with respect to multiple battery packs including receive information from multiple battery packs, send information to multiple battery packs, send information to multiple battery packs, initiate the "find me" function described above with respect to multiple battery packs, and/or manage the "last known location" information described above with respect to multiple battery packs. These functions may be performed with respect to multiple battery packs or these functions may be selectively performed with any subsets of the multiple battery packs an electronic device may be in communication with. Software application 222 may perform the functions described herein with multiple battery packs and/or with any subset of the multiple battery packs. In some cases, software application 222 may enable a user to switch between screens or windows which are each associated with one of multiple battery packs.

In some configurations, switching circuitry 110, device interface 182, and/or device interface 184 may detect when an electronic device is attached to battery pack 100 by determining when current is being drawn from battery pack 100 through device interface 182 and/or device interface 184. In one example, battery pack 100 may attempt to establish communication with an electronic device when current draw is detected. In other words, battery pack 100 may initiate communication with device 220 over wireless communication link 255, or with device 210 over cable 219, when battery pack 100 detects that current is being drawn from the respective device interface.

Figure 3A:
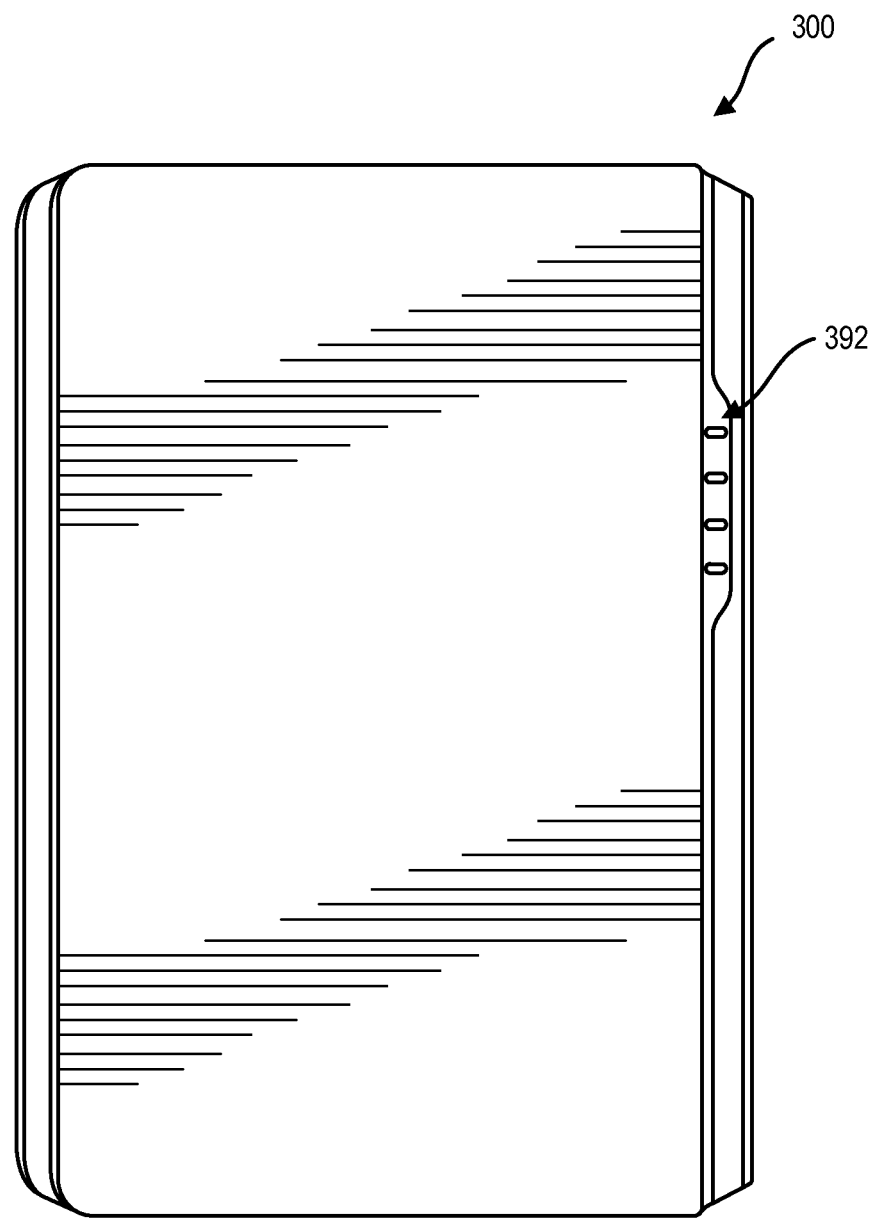
FIGS. 3A-3C illustrate three views of a battery pack in accordance with the techniques introduced herein.
Figure 3B:
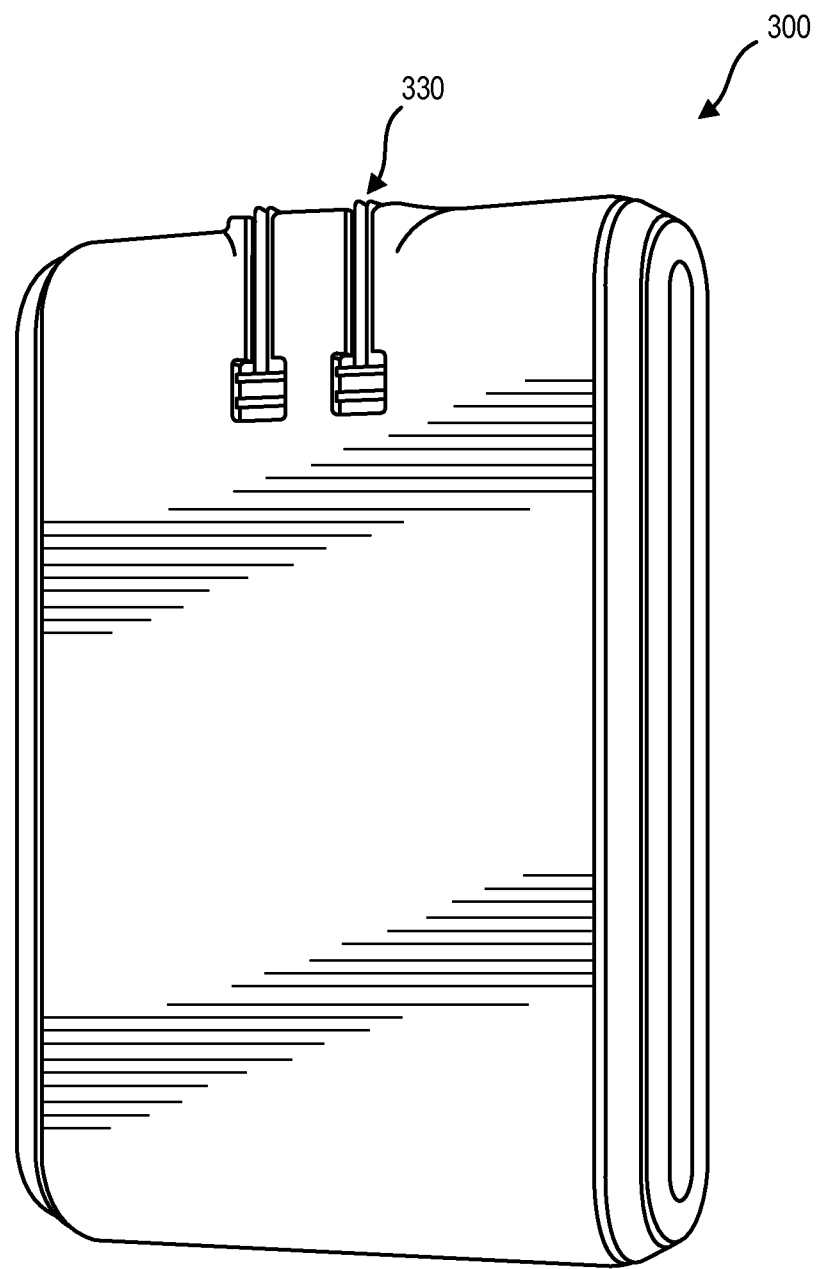
Figure 3C:
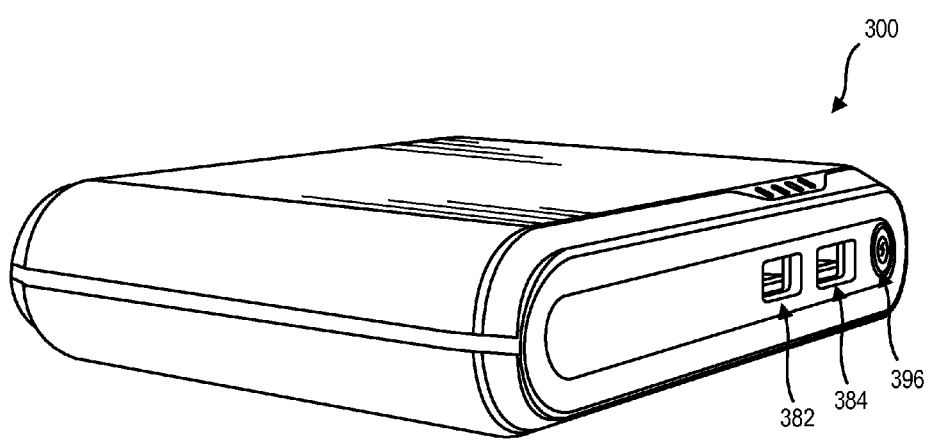

FIGS. 3A-3C illustrate three views of a battery pack 300 in accordance with the techniques introduced herein. Battery pack 300 may include any of the features of battery pack 100. As illustrated in FIG. 3B, battery pack 300 includes electrical plug 330. Electrical plug 330 is an example of input power interface 130 of FIG. 1. Electrical plug 330 is illustrated in FIG. 3B in a stowed position. Electrical plug 330 is configured to rotate out in order to be plugged into a standard 110 VAC electrical outlet for purposes of charging battery pack 300. Many other configurations and plug types are possible.

As illustrated in FIG. 3A, battery pack 300 also includes display feature 392. Display feature 392 is an example of display element(s) 192 of FIG. 1. The four display elements which make up display feature 392 may be used to convey a variety of information regarding status or operation of battery pack 300. For example, when the battery pack is at or near empty, all of the display elements may be dark. Alternately, a single display element may be illuminated, or illuminated weakly. A portion of the display elements may also be illuminated in proportion to the approximate charge level of the battery pack (e.g., 1 illuminated element corresponds to a charge level of approximately 25%, 2 illuminated elements correspond to a charge level of approximately 50%, 3 illuminated elements correspond to a charge level of approximately 75%, 4 illuminated elements correspond to a charge level of full or near full). More or fewer display elements are possible. The display elements may only illuminate when the battery pack is being charged and/or is powered on and may extinguish shortly after the battery pack is unplugged or turned off. In another example, the display elements may only display status information periodically or in response to another event in order to preserve battery power. The display elements may also illuminate, pulse, cycle, or be activated in one or more other patterns or sequences in order to communicate other information about a status, mode, or condition of battery pack 300.

As illustrate in FIG. 3C, battery pack 300 also includes device interface 382 and device interface 384. Each of device interface 382 and device interface 384 are examples of device interface 182 and/or device interface 184 of FIG. 1. Device interface 382 and device interface 384 may each include USB ports to which an electronic device can be attached for purposes of powering the electronic device or charging a rechargeable battery of the electronic device. Many other types of device interfaces are possible. As discussed with respect to FIG. 2, an attached electronic device may communicate with battery pack 300 through the cable used to provide power to the electronic device or through a separate wireless communication link established between the electronic device and battery pack 300. Battery pack 300 also includes a switch 396 for turning battery pack 300 on or off. Switch 396 is an example of input 196 of FIG. 1.

Battery pack 300 may include software or firmware making it compatible with particular electronic devices. For example, battery pack 300 may include software enabling it to communicate with APPLE iOS devices, ANDROID devices, devices from another manufacturer, and/or other types, classes, categories, of electronic devices. In some cases, enabling battery pack 300 to communicate with particular devices may include setting, controlling, or reading voltages on pins of device interface 382 and/or device interface 384.

Figure 4A:
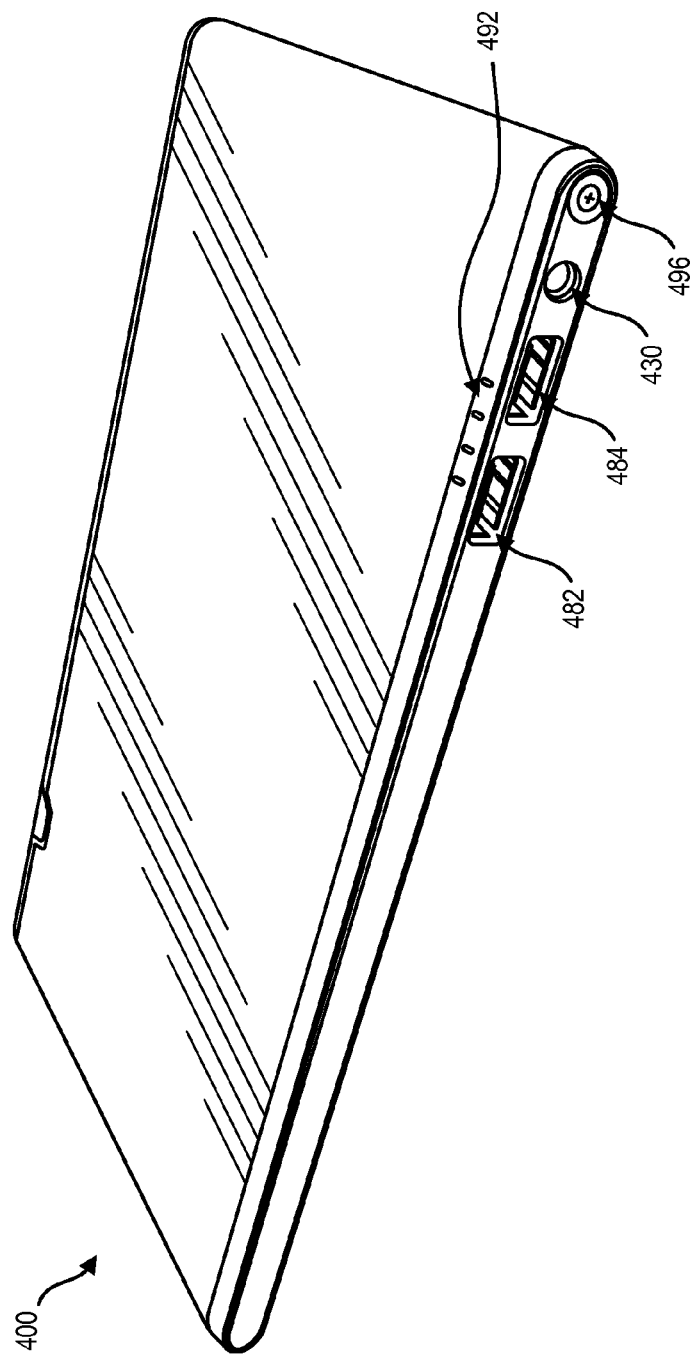
FIGS. 4A-4B illustrate two views of a battery pack in accordance with the techniques introduced herein.
Figure 4B:
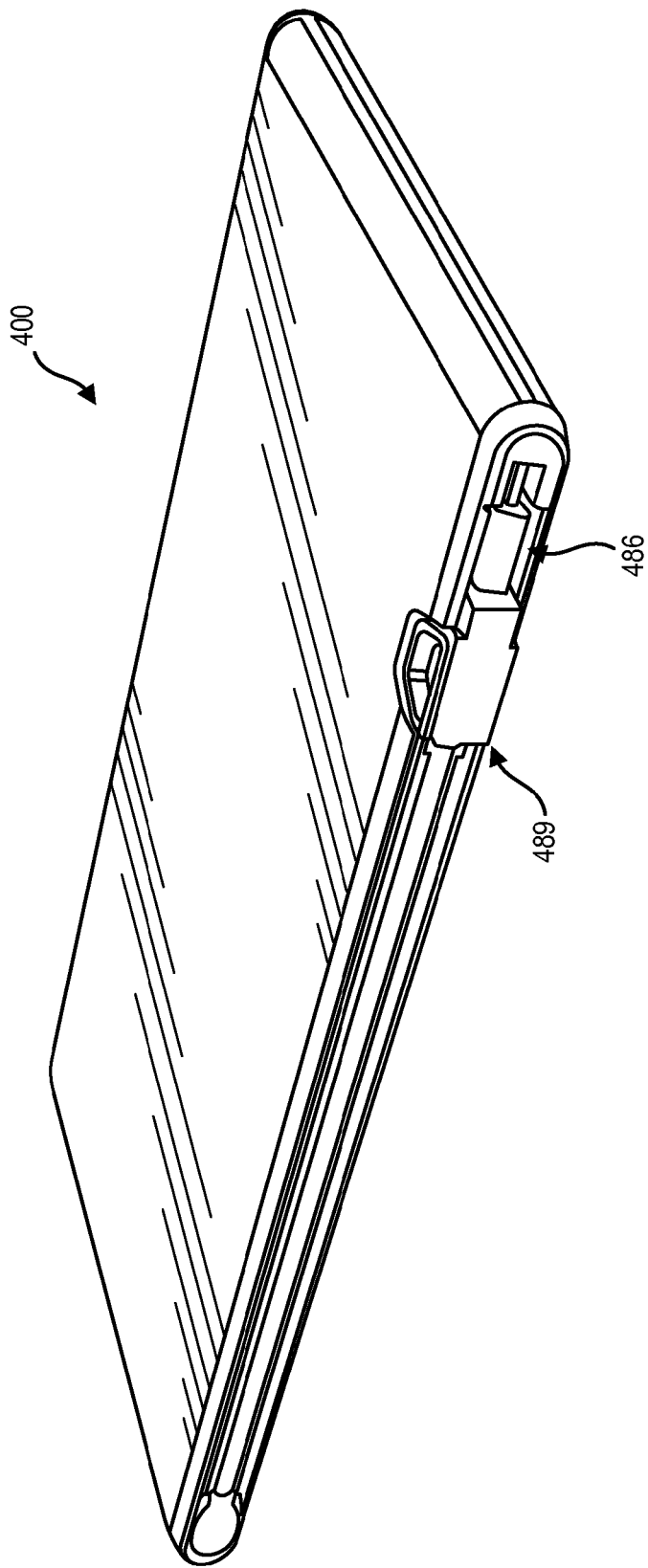

FIGS. 4A-4B illustrate two views of a battery pack 400 in accordance with techniques introduced herein. Battery pack 400 is an example of battery pack 100 and/or battery pack 300. Battery pack 400 includes display elements 492. Display elements 492 are examples of display element(s) 192 and/or display elements 392. Battery pack 400 also includes electrical plug receptacle 430. Electrical plug receptacle 430 is an example of input power interface 130 of FIG. 1. While battery pack 400 may be intended to be powered by high voltage power (e.g., 110 VAC, 120 VAC, 220 VAC, 240 VAC), battery pack 400 may be configured to receive a lower voltage at electrical plug receptacle 430. For example, battery pack 400 may be configured to receive 5 VDC or 12 VDC power at electrical plug receptacle 430. An external transformer (not pictured) may be used to power battery pack 400 from a higher voltage power source. Many other input voltages and connector types are possible.

Battery pack 400 also includes device interface 482 and device interface 484. Each of device interface 482 and device interface 484 are examples of device interface 182, device interface 184, device interface 382, and/or device interface 384. Device interface 482 and device interface 484 may each include USB ports to which an electronic device can be attached for purposes of charging the electronic device. Battery pack 400 also includes device interface 486. Device interface 486 performs a function similar to that of one or more of device interfaces 182, 184, 482, and/or 484 but includes an integrated flexible cable for attaching battery pack 400 to an electronic device. When not in use, the cable is stowed in a channel or slot in a side of battery case 400. A flexible gripping device 489 is also included for purposes of holding device interface 486 and the associated cable in the stowed position as well as for making it easier for a user to remove device interface 486 from the stowed position for use. While one cabled device interface is illustrated in FIG. 4B, additional and/or other varied types of cabled device interfaces are possible.

As discussed with respect to FIG. 2, an attached electronic device may communicate with battery pack 400 through one of the device interfaces or through a separate wireless communication link established between the electronic device and battery pack 400. Battery pack 400 also includes a switch 496 for turning battery pack 400 on or off. Switch 496 is an example of input 196 of FIG. 1. Switch 496, or another switch, button, or user input device, may also be used to provide input information to battery pack 400.

Battery pack 400 may be configured in a variety of capacities. For example, battery pack 400 may be available in 1 ampere-hour, 2 ampere-hour, 5 ampere-hour, 8 ampere-hour, and/or 10 ampere-hour versions. Many other capacities are possible. In some configurations, the battery cells may be accessible by an end user such that an end user can replace an old battery cell that no longer works well. In addition, battery pack 400 may be designed to be expandable such that an end user can add or remove cells to change the total capacity of battery pack 400.

Figure 5:
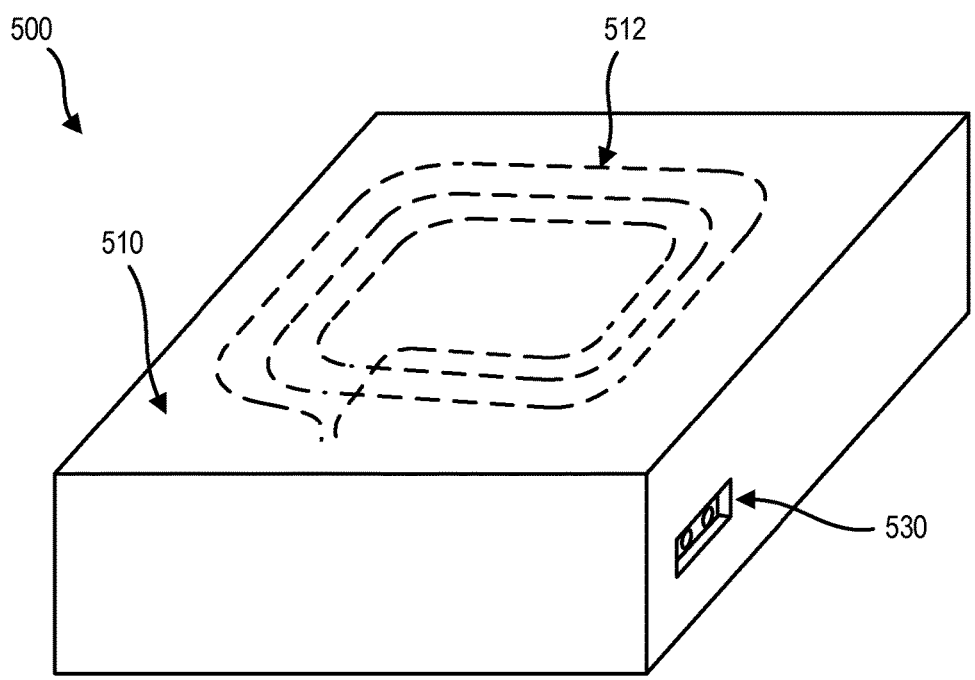
FIG. 5 illustrates a battery pack having an inductive coil in accordance with the techniques introduced herein.

FIG. 5 illustrates a battery pack 500 having an inductive coil in accordance with the techniques introduced herein. Battery pack 500 may include any of the features or components of battery pack 100, battery pack 300, and/or battery pack 400. Battery pack 500 includes an electrical port 530 for receiving electrical power from an external power source to charge one or more batteries contained in battery pack 500. Electrical port 530 is an example of input power interface 130, electrical plug 330, and/or electrical plug receptacle 430. Power may be provided to electrical port 530 from a wall outlet, a mains connection, a charging station, another battery pack, a solar energy capture device, a kinetic energy capture device, a thermal energy capture device, or from any other energy or power source.

Battery pack 500 also includes inductive coil 512. Inductive coil 512 may be inside battery pack 500, near surface 510 of battery pack 500, or on surface 510 of battery pack 500. Inductive coil 512 may also be referred to as an electrical coil, an inductive electrical coil, a winding, or simply as a coil. Inductive coil 512 is used to wirelessly transfer power stored in the battery(s) of battery pack 500 to an electronic device, such as a smartphone. Inductive coil 512 includes any electrically conductive wire, cable, printed circuit board trace, or other electrically conductive material that produces a magnetic field when electrical current is conducted through it. Inductive coil 512 may have a variety of shapes or structures including circular, square, rectangular, concentric, and/or helical. While inductive coil 512 will typically have multiple loops or turns, inductive coil 512 may include only a single loop in some applications.

A device that wirelessly receives power from battery pack 500 also has an inductive coil (not pictured in FIG. 5). Two conductors or coils are referred to as inductively coupled, mutually inductively coupled, or magnetically coupled when they are configured such that a change in current flow through one coil induces a voltage across the ends of the other coil through electromagnetic induction. This occurs even though the two coils are not physically connected.

The amount of inductive coupling between two conductors is measured by their mutual inductance. The coupling between the two conductors is significantly increased by winding them into coils and placing them close together on a common axis such that the magnetic field of one coil passes, substantially, through the other coil. Beneficially, power can be transferred from one coil to another without any physical or direct electrical interconnection between the two coils. A number of wireless charging standards have been developed for charging portable electrical or electronic devices. These standards include, but are not limited to, Qi and Powermat. The techniques disclosed herein may be used with these or any other wireless charging standard, format, and/or protocol.

Furthermore, a coil such as inductive coil 512 may also be used to implement or support resonant inductive coupling between battery pack 500 and an electronic device being charged by battery pack 500. Resonant inductive coupling involves near field wireless transmission of electrical energy between two magnetically coupled coils that are part of resonant circuits tuned to resonate at similar frequencies. Resonant transfer occurs when a coil ring with an oscillating current generates an oscillating magnetic field. Because the coil is highly resonant, any energy injected into the coil dies away relatively slowly. However, if a second resonant coil is brought near the first coil, the second coil can pick up much of the energy before it is lost. The fields used are predominately non-radiative and sometimes referred to as evanescent waves. Resonant inductive coupling allows the wireless transfer of electrical power over greater distances than basic inductive coupling. Additional electrical components may be used with the inductive coil to form each of the resonant circuits.

Industry standards, such as Rezence, are also developing for wireless charging of portable electronic devices using resonant inductive coupling techniques like that described above. The improvements disclosed herein may also be used with any standard, format, and/or protocol developed for resonant inductive charging or resonant inductive coupling, or with any other type of wireless charging.

Returning back to FIG. 5, electrical circuitry (not pictured) in battery pack 500 is used to drive or transfer electrical energy stored in battery(s) of battery pack 500 through inductive coil 512 to wirelessly charge an electronic device that is external to battery pack 500. The electrical circuitry of battery pack 500 may include digital components, analog components, discrete components, integrated circuits, a microprocessor, a microcontroller, a digital signal processor, and/or a memory. Beneficially, an electronic device, such as a smartphone, with wireless charging capability may be charged by simply setting it on surface 510 of battery pack 500 or otherwise placing it near inductive coil 512 of battery pack of 500. Charging the electronic device is much more convenient because no cable is needed and the user does not to make/break electrical connections or handle a cable each time charging is started/discontinued. In addition, compatibility among multiple device types can be improved because a particular electromechanical connector type/shape is not needed to interface battery pack 500 to an electronic device. The wireless charging capability of the electronic device may be built-in or integral to the electronic device or may be implemented in an accessory to the electronic device, such as in a protective case, cover, or enclosure attached to the electronic device.

In one variation of battery pack 500 of FIG. 5, the functions of inductive coil 512 and electrical port 530 may be reversed. In other words, in this variation, electrical port 530 is configured as an output port for providing electrical power stored in battery(s) of battery pack 500 to an electronic device through a wired or cabled connection. In this variation, inductive coil 512 is used for receiving electrical power from an external power source for charging the battery(s). In this way, battery pack 500 can be charged wirelessly without attaching it to an external power source with a wire or cable.

In another variation, battery pack 500 may be configurable to operate in either one of the two modes described above. In other words, battery pack may be alternately operated with electrical port 530 used for power input and inductive coil 512 used for power output or with electrical port 530 used for power output and inductive coil 512 used for power input. Electrical circuitry included in battery pack 500 may be used to implement and switch between these dual modes of operation.

Battery pack 500 may also include a housing that is water resistant, water proof, dust resistant, dust proof, shock resistant, shock proof, impact resistant, impact proof, crush resistant, and/or crush proof. In some situations, the housing may also be referred to as a case, a protective case, a shell, or a protective shell. The housing may provide any or all of these types of protection to the components of battery pack 500.

Figure 6:
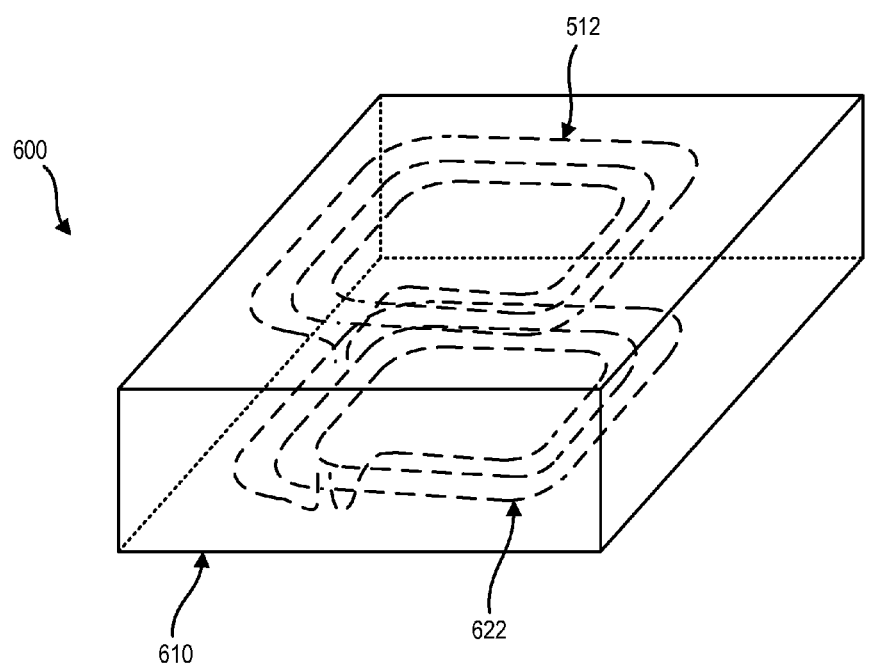
FIG. 6 illustrates a battery pack having two inductive coils in accordance with the techniques introduced herein.

FIG. 6 illustrates a battery pack 600 having two inductive coils in accordance with techniques introduced herein. Battery pack 600 includes inductive coil 512 at or near a first surface of battery pack 600 similar to the battery pack 500 of FIG. 5. Battery pack 600 also includes inductive coil 622 at or near another surface, surface 610, of battery pack 600. One of inductive coil 512 or inductive coil 622 is used for wirelessly transferring electrical power stored in battery(s) of battery pack 600 to an electronic device which is external to battery pack 600, such as to a mobile computing device. The other of inductive coil 512 or inductive coil 612 is used for wirelessly receiving electrical power from an external power source for charging the battery(s) of battery pack 600.

Beneficially, battery pack 600 may be both charged and discharged wirelessly. This makes it possible, although not required, to implement battery pack 600 with no external electromechanical connectors. This configuration provides several potential improvements or improvement opportunities for battery pack 600 including: a smaller housing, improved resistance to water, snow, dust, mud, or other contaminants, improved aesthetics, improved compatibility with various devices, and/or a smoother outer envelope that is easier to insert into pockets, bags, purses, backpacks, or brief cases without snagging on other items. A smoother outer surface makes it more straightforward to apply external housing treatments to battery pack 500 such as, cases, covers, fabrics, textiles, aesthetically pleasing coverings, and/or coatings or coverings with increased grip characteristics.

Battery pack 600 may be wirelessly charged from a wide variety of wireless charging sources. Battery pack 600 may also be used to charge a wide variety of devices having wireless charging capability.

Inductive coil 512 and inductive coil 622 may be constructed of the same material or may be constructed of different materials. In addition, inductive coil 512 and inductive coil 622 may be have the same size, shape, or number of coils, or may have different sizes, shapes, or number of coils. Each of inductive coil 512 and inductive coil 622 may have characteristics which are tailored to different wireless charging standards, protocols, or formats. Similarly, one or the other of inductive coil 512 and inductive coil 622 may be configured for operation using resonant inductive coupling as described above. The electrical circuitry of battery pack 600 may enable, disable, activate, deactivate, engage, or disengage various other electrical components of battery pack 600 in order to change an operational mode of inductive coil 512 or inductive coil 622, such as to switch between basic inductive operation and resonant inductive operation or to switch between input and output modes for either of the coils.

In one mode of operation, battery pack 600 may use one or more of inductive coil 512 and inductive coil 622 to gather information to determine a mode of operation. For example, battery pack 600 may temporarily operate both coils in an input mode to determine which is coupled, or best coupled, with an external input power source. By detecting which coil is best coupled with the power source, battery pack 600 may then configure itself to receive power through that coil. In this way, a user may alternately charge battery pack 600 from either side or without considering which side may be the input side. A user may or may not be aware that any of these processes are occurring. Although not illustrated in FIG. 6, battery pack 600 may have one or more indicators to indicate a state, status, or mode of operation of battery pack 600.

In another variation, battery pack 600 may activate both coils in the same mode at the same time. In other words, both of coils 512 and 622 may be used for wirelessly receiving power from a single external power source even though one of the coils is likely closer to the source and may receive the wireless power from the source more effectively or efficiently than the other coil. Similarly, both of the coils may be used to simultaneously transmit power to an electronic device even though one may be doing so more effectively than the other due to proximity to the electronic device. However, in some configurations it may be more desirable to reduce potential simultaneous engagement of both coils and battery pack 600 may include internal shielding for isolating the coils and reducing the likelihood that fields generated by or received by one of the coils will affect, be received by, or interfere with the other coil.

Figure 7:
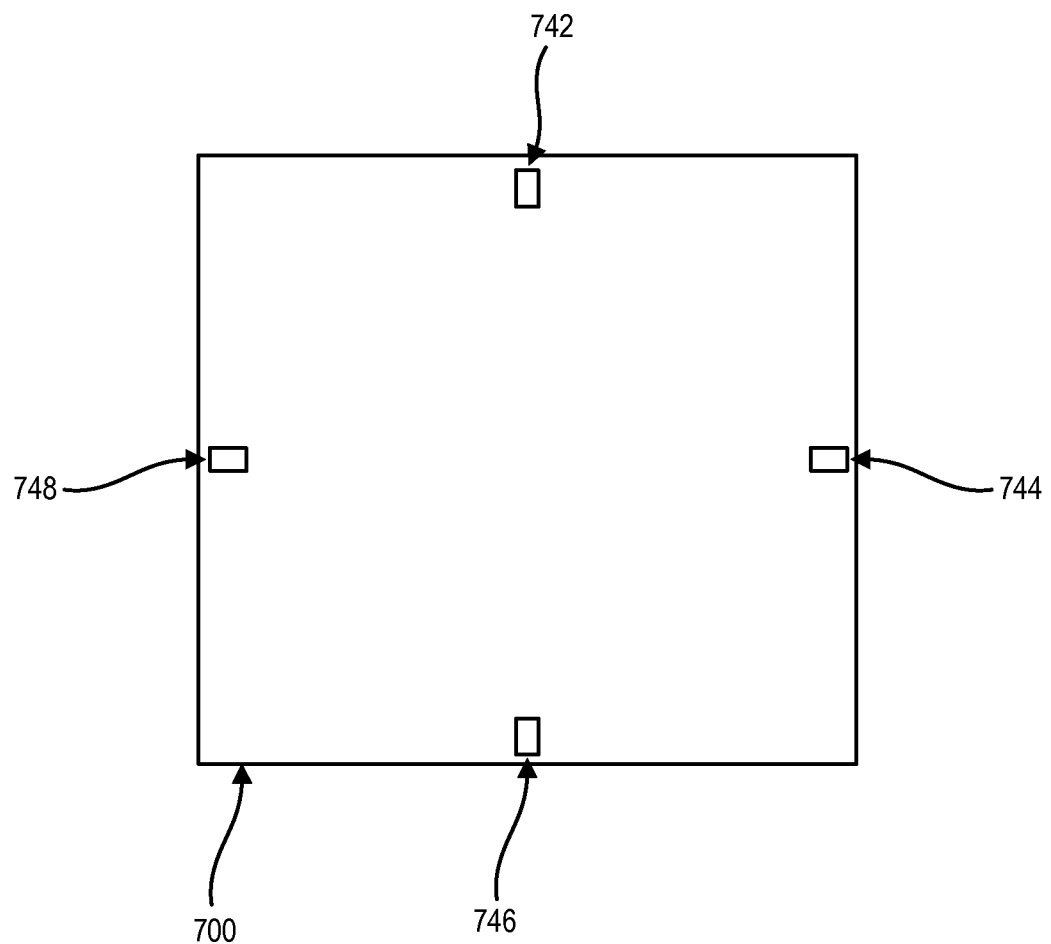
FIG. 7 illustrates a battery pack having alignment indicators in accordance with the techniques introduced herein.

FIG. 7 illustrates a battery pack 700 having alignment indicators in accordance with the techniques disclosed herein. Battery pack 700 may include any of the components or features of battery pack 100, battery pack 300, battery pack 400, battery pack 500, and/or battery pack 600. Battery pack 700 includes visual indicators 742, 744, 746, and 748. Each of visual indicators 742-748 may include an LED, a liquid crystal display (LCD) element, an electronic ink (e-ink) element or any other type of information display element on which information can be displayed or visually communicated to a user of battery pack 700. A larger or smaller number of visual indicators is possible and the techniques disclosed herein are not to be limited to four indicators, or to any other specific number of indicators. In addition, visual indicators 742-748 may be located in different places on battery pack 700 than illustrated in FIG. 7. In some configurations, the locations of visual indicators 742-748 on battery pack 700 may be chosen based on the typical types and sizes of electronic devices commonly used in conjunction with battery pack 700.

Visual indicators 742-748 provide visual feedback to a user of battery pack 700 with respect to a preferred or improved alignment of an electronic device relative to battery pack 700. The efficiency or effectiveness of wireless power transfer can be significantly affected by how well the inductive coils of the two devices are aligned. Battery pack 700 may determine if a repositioning or alignment adjustment of the electronic device being charged may improve charging performance and provide indication of a suggested adjustment using visual indicators 742-748. In one example, battery pack 700 may determine that movement of the electronic device to the left, relative to battery pack 700, may improve charging performance and may temporarily illuminate visual indicator 748 to indicate this to the user. In another example, charging performance may be improved by moving the device to the lower right, relative to battery pack 700, and visual indicators 744 and 746 may be illuminated accordingly. In FIG. 7, the directions associated with the indicators may have approximately ninety degree relationships to each other in a plane that is approximately parallel to the illustrated surface of the battery pack.

In some configurations, battery case 700 may have multiple sensors or smaller coils distributed across its surface to gather information for determining the suggested alignment information discussed above. For example, sensors or coils, that may not necessarily be highly effective for transferring power, may be used for determining a strength of magnetic coupling with the coil of the electronic device. Comparison of data from the sensors or coils spread across an area of the surface of battery pack 700 can be used to determine how the alignment can be improved to provide better coupling between a primary charging coil of battery pack 700 and a power receiving coil of the electronic device.

Figure 8:
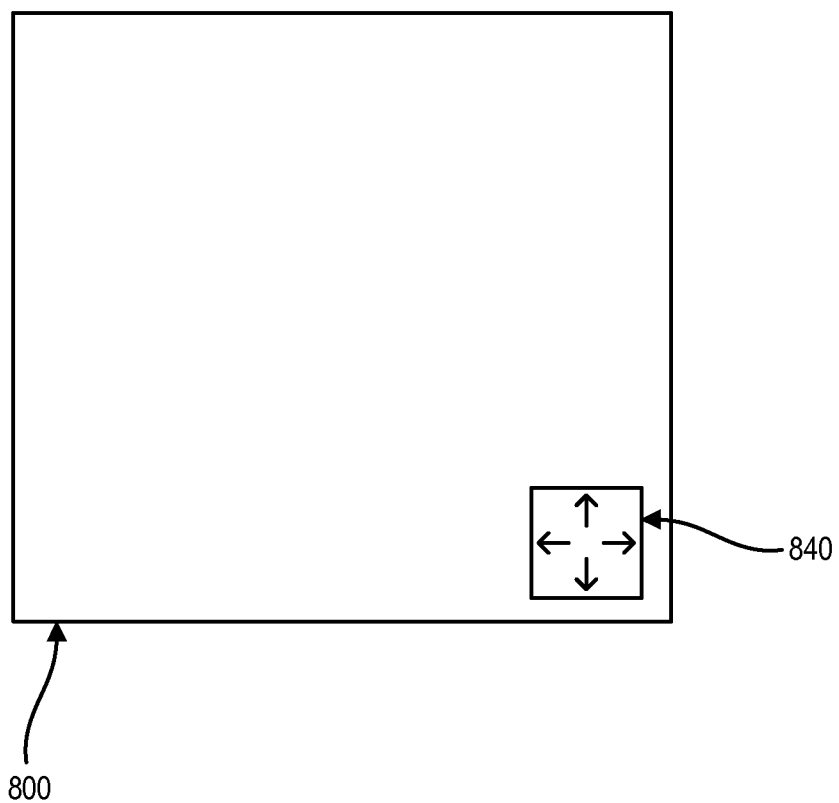
FIG. 8 illustrates a battery pack having an alignment indicator in accordance with the techniques introduced herein.

FIG. 8 illustrates battery pack 800 having alignment indicator 840 in accordance with techniques introduced herein. Battery pack 800 operates similarly to battery pack 700 of FIG. 7 with the primary difference being that the functions of visual indicators 742-748 are integrated into a single alignment indicator 840 that is capable of providing all of the information in a single display element. In one example, visual indicator is small LCD display having individual segments with directional arrows that may be individually activated. Alignment indicator 840 may be implemented using a number of other known display technologies.

In some situations, battery pack 700 or battery pack 800 may be placed on a fixed surface having wireless charging functions. Examples of wireless charging surfaces include tables in coffee shops or restaurants, nightstands, and surfaces in automobiles. The visual indicators of FIG. 7 or 8 may also be used to indicate to a user how battery pack 700 or battery pack 800 should be repositioned relative to the charging source. In other words, the visual indicators may relate to suggested movement of a device being used with one of the disclosed battery packs and may also be used to indicate a suggested movement of the battery pack relative to a charging source.

Figure 9:
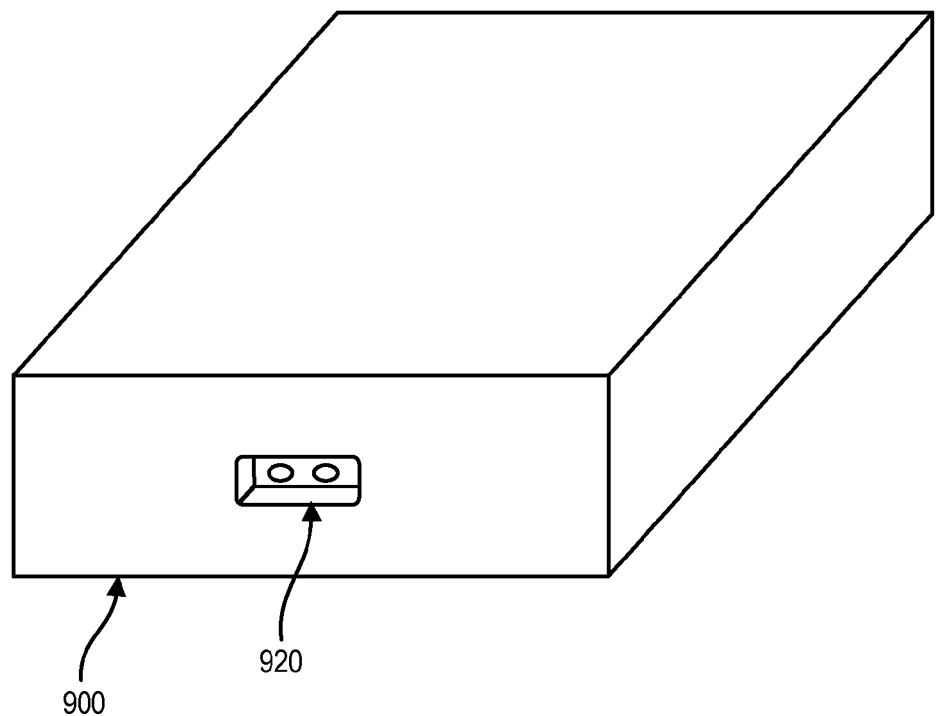
FIG. 9 illustrates a battery pack having a single interface connector in accordance with the techniques introduced herein.

FIG. 9 illustrates a battery pack 900 having a single electrical interface port 920. Electrical interface port 920 may be bidirectional in that it may be used for both receiving electrical power and for transmitting electrical power. Battery(s) of battery pack 900 may be charged using power provided by an external source and conducted through a cable attached to electrical interface port 920. In addition, battery(s) of battery pack 900 may also be used to charge an electronic device, such as a smartphone, through a cable attached to electrical interface port 920 at a different time. In other words, electrical interface port 920 is used for both charging and discharging of battery pack 900. The two operations may be performed using the same cable or a different cable. In some configurations, a cable may not be required and an electrical interface of an electronic device may interface directly to electrical interface port 920. In another variation, battery pack 900 may have an integrated cable similar to that illustrated in FIG. 4B.

Electrical circuitry in battery pack 900 may initially sense whether a device attached to electrical port 920 is tending to draw current or supply current in order to actively switch battery pack 900 and/or electrical port 920 from one mode to the other. Alternately, the electrical circuitry may detect, assert, send, or receive a control signal indicating a mode of operation. In one example, electrical interface port 920 may be a Type-C USB port. A type-C USB typically utilizes the same connectors on both ends of a cable and supports bi-directional power flow such that the single electrical interface port 920 of battery pack 900 may be used with a single cable, and without inverting the cable, regardless of whether battery pack 900 is being charged or is being used to charge another device.

Figure 10:
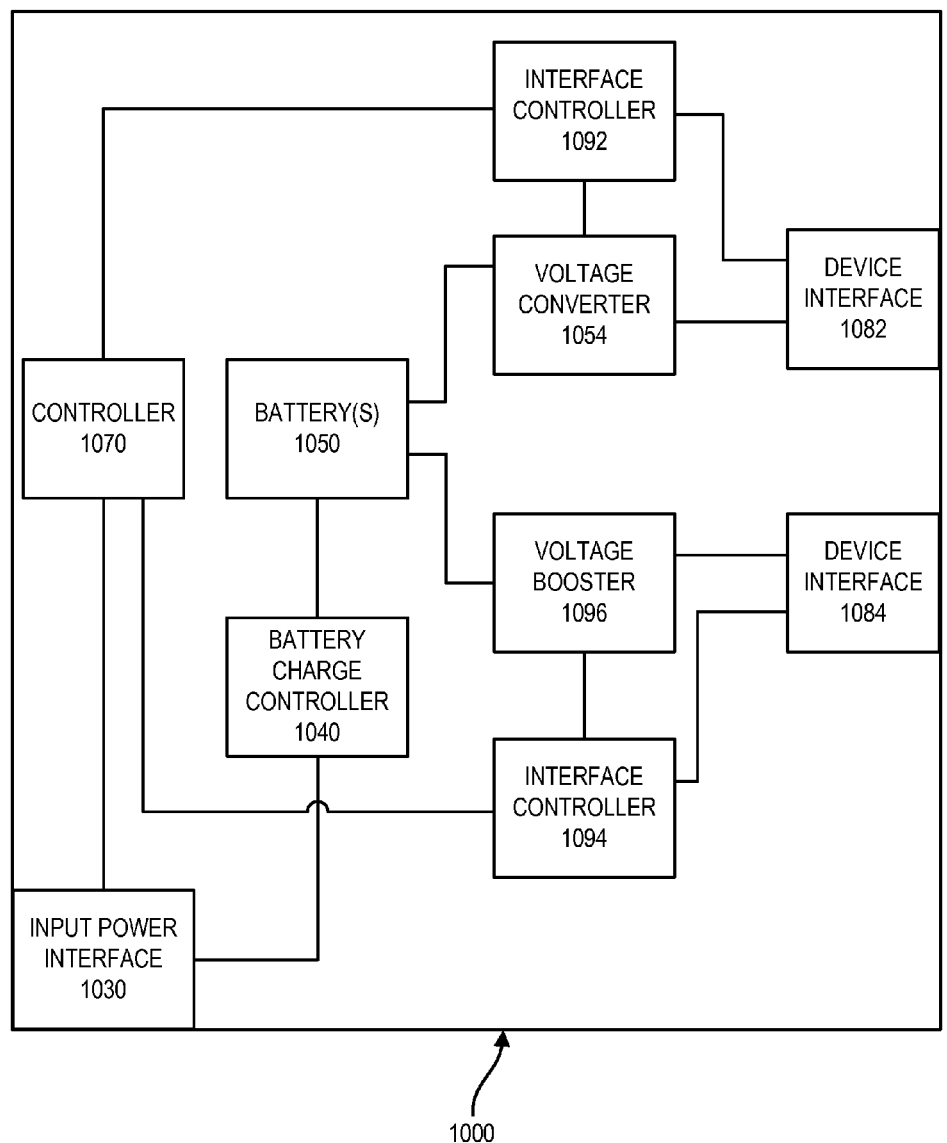
FIG. 10 illustrates a block diagram of a battery pack having two device interfaces in accordance with the techniques introduced herein.

FIG. 10 illustrates a block diagram of a battery pack 1000 having two device interfaces. Battery pack 1000 includes battery(s) 1050, battery charge controller 1040, controller 1070, input power interface 1030, interface controller 1092, voltage converter 1054, device interface 1082, voltage booster 1096, interface controller 1094, and device interface 1084. Controller 1070 is an example of control circuitry 170 of FIG. 1. Input power interface 1030 is an example of input power interface 130 of FIG. 1. Battery(s) 1050 is an example of battery(s) 150 of FIG. 1. Battery charge controller 1040 is an example of battery charger/monitor 140 of FIG. 1.

In the example of battery pack 1000, device interface 1082 and device interface 1082 may support different electrical and/or mechanical interfaces which are not necessarily compatible with each other. In other words, battery pack 1000 may include support for two different charging interface standards that have different electrical and/or mechanical characteristics or specifications. Thus, battery pack 1000 may be able to charge two different types of devices, either sequentially or simultaneously, even though the devices have different voltage requirements, different current requirements, different interface requirements, different interface formats, different connector requirements, and/or different interface protocols.

In one implementation, device interface 1082 is a USB port that includes auto sensing or auto detect functionality that adjusts the output current of device interface 1082 based upon detected voltages on the D+ and D− USB data lines of the USB port. Interface controller 1092 implements the logic or functions of this type of interface. Interface controller 1092 may be a standalone integrated circuit or the functions of interface controller 1092 may be implemented in one or more other devices of battery pack 1000. Voltage converter 1054 is an example of voltage converter 154 and provides any necessary voltage conversion, adjustment, or conditioning necessary between the voltage of battery(s) 1050 and the desired output voltage at device interface 1082. Voltage converter 1054 and/or one or more other components or devices of battery pack 1000 may also limit or control the amount of current delivered through device interface 1082.

Because device interface 1084 may be associated with a different interface standard or protocol than device interface 1082 and/or may have different interface characteristics, device interface 1084 may be supported by separate elements of battery pack 1000, such as interface controller 1094 and voltage booster 1096. Interface controller 1094 may implement or support a different interface than interface controller 1092. For example, device interface 1084 may be or may support a Quick Charge 2.0 interface. Because this interface is different than the USB auto-detect interface discussed above with respect to device interface 1082, a different interface controller, such as interface controller 1094, may be necessary. Many different interface combinations are possible and the techniques disclosed herein are not to be limited to any particular interface combinations. Interface controller 1094 may be a standalone device as illustrated or the functions of interface controller 1094 may be implemented in one or more other devices of battery pack 1000.

Interface controller 1092 and voltage converter 1054 meet the needs of device interface 1082 while interface controller 1094 and voltage booster 1096 meet the needs of device interface 1084. As illustrated in FIG. 10, each device interface may require separate or different voltage control functions. In the example of Quick Charge 2.0, higher charging voltages may be used (e.g., 9 volts, 12 volts) requiring using of a voltage booster, such as voltage booster 1096, for generating one or more of these higher voltages from the output of battery(s) 1050. This type of voltage boost may not be needed for the other device interface, device interface 1082, as illustrated in FIG. 10. In some configurations, battery pack 1000 may provide charging power through device interface 1082 and device interface 1084 simultaneously, providing different interface characteristics, voltages, and/or currents to each depending on the nature of each particular interface. In this way, battery pack 1000 can support multiple charging interfaces or standards and can be used with a wider range of electronic devices. In other configurations, battery pack 1000 may only provide power through one of device interface 1082 and device interface 1084 at any particular time.

Figure 11:
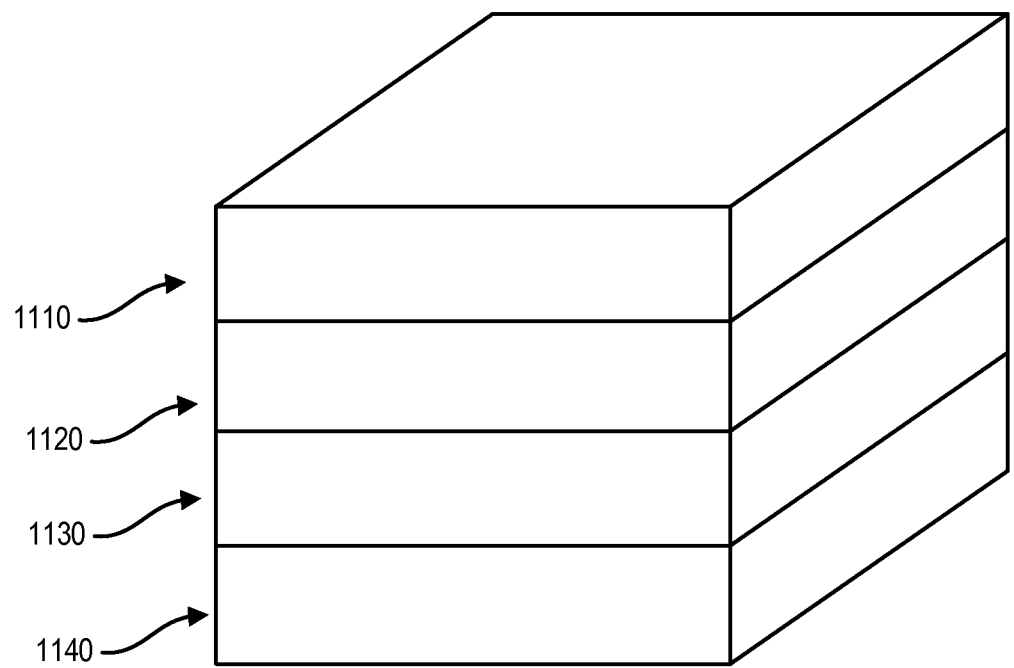
FIG. 11 illustrates stacked battery packs in accordance with the techniques introduced herein.

FIG. 11 illustrates a stackable set of battery packs 1110-1140. Each of battery packs 1110-1140 may be an example of any of the other battery packs disclosed herein and may contain any of the features or functions of any of the other battery packs disclosed herein. Battery packs 1110-1140 are designed to be stacked and may include features such that they may be charged while stacked.

Each of battery packs 1110-1140 may include mating or corresponding electrical contacts such that the contacts of any two battery packs are in contact with each other when one of the battery packs is stacked on the other. One or both battery packs may also contain mechanical registration of alignment features making it easier to align the battery packs when stacked such that the electrical contacts are in contact with each other. The interconnected battery packs may then be charged simultaneously or from a single electrical source as is discussed further with respect to FIG. 12. As an alternative to electrical contacts between the battery packs, power may be transferred between one or more of battery packs 1110-1140 using one or more of the methods of wireless power transfer disclosed herein.

Figure 12:
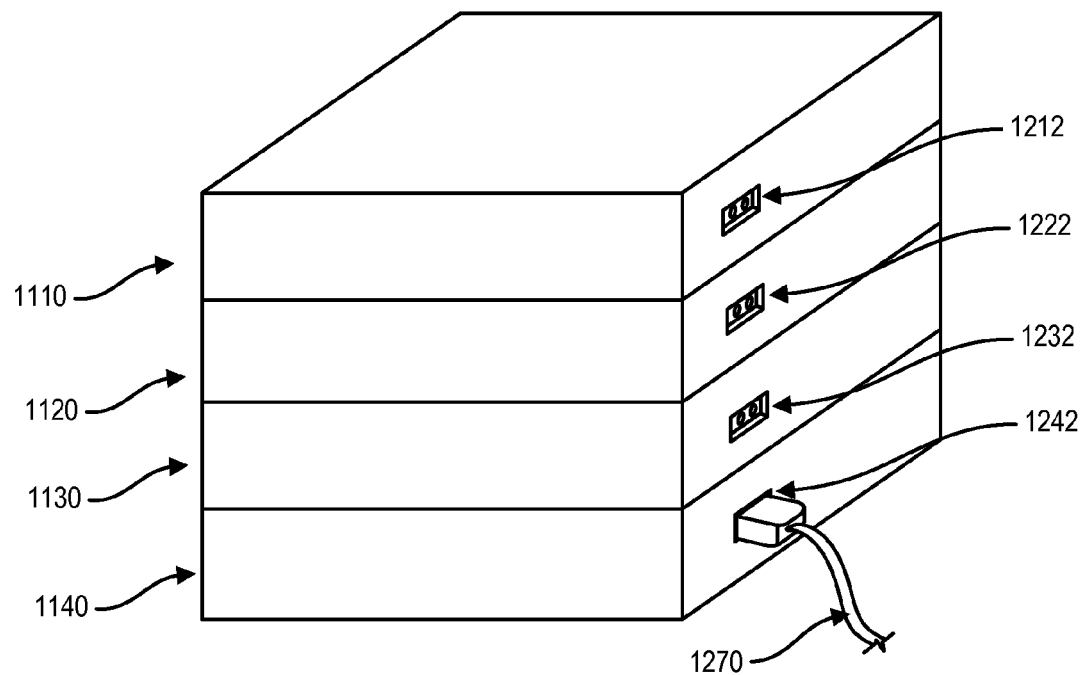
FIG. 12 illustrates stacked battery packs interfaced to an external power supply in accordance with the techniques introduced herein.

FIG. 12 illustrates stacked battery packs 1110-1140 of FIG. 11 connected to an electrical source by a cable 1270 connected to an external power source (not illustrated). In FIG. 12, each of battery packs 1110-1140 contain an associated electrical port, electrical ports 1212-1242. Each of electrical ports 1212-1242 is an example of input power interface 130, electrical port 530, and/or input power interface 1030, and may be used to provide electrical power to the associated battery pack. For example, cable 1270 is connected to battery pack 1140 to provide charging power to a rechargeable battery of battery pack 1140 through electrical port 1242. Using wired or wireless connections between the stacked battery packs, some or all of the electrical power provided through electrical port 1242 may be provided by battery pack 1140 to one or more of battery packs 1110, 1120, and/or 1130.

In some configurations, wired or wireless data communications may occur between battery packs 1110-1140 related to charging activities. Data communications may occur between the battery packs to exchange information such as: charge state, percentage full, capacity, identifying information, operational characteristics, health, number of charge cycles endured, number of charge cycles remaining, charge rate, maximum charge rate, performance characteristics, temperature, and/or other operational information. This information may be used to determine how to distribute power delivered by cable 1270 and/or determine how power already available in any of the battery packs should be distributed among the other battery packs. Beneficially, all of the battery packs may be charged using a single electrical power source or cable, such as cable 1270, and some of the battery packs may be removed from the charging stack without having to disconnect a charging cable.

In one specific example, battery pack 1140 is directly receiving all of the external charge power through cable 1270 but may not need any of that power because it may already be fully charged. Consequently, it may be determined through the data communications described above the most or all of the available charging power should be distributed to battery pack 1130 and 1110. Consequently, all of the received charging power may be passed from battery pack 1140 to battery pack 1130, through a hard electrical connection established between the battery packs, or wirelessly. In this example, battery pack 1130 may use a predetermined amount of the received power while passing the remainder on to battery pack 1110, in some cases through battery pack 1120. The available power may be distributed among a specified number of the battery packs proportionately, or disproportionately, based on any of the factors described herein. For example, a larger percentage of the available charging power may be distributed to battery pack 1110 than to battery pack 1130 because battery pack 1110 may currently be at a lower charge state than battery pack 1130.

The proportion or distribution of the power among the battery packs may change over time as the battery packs charge further. For example, the disproportionately large percentage of the available battery that is initially being delivered to battery pack 1110 in the example above may be reduced when battery pack 1110 has reached a specified charge level or has reached a charge level that is at least as high as battery pack 1130. This is one example and many other charging schemes or power distribution algorithms are possible based, at least in part, on the information about the various battery packs and/or the information shared between the various battery packs.

In order to implement any of the charging schemes described herein that include multiple battery packs, one of the battery packs may act in a control, master, or primary role in terms of controlling the operation. For example, in FIG. 12, battery pack 1140 may take the primary role in controlling the charging operation while the other battery packs take on a secondary role and respond to commands or instructions provided by the primary battery pack. Any of the battery packs may have the capability to perform as both a primary or secondary depending on the particular configuration of circumstances.

In one variation of the charging schemes discussed above, one or more of the battery packs may make determinations about where a battery pack resides in the stack and charging preference may be given based on the position in the stack. For example, highest charging preference may be given to the battery pack that is at the stop of the stack in order to give that top battery pack the maximum possible charge when a user picks it up off of the top of the stack for use. If the battery pack at the top of the stack reaches its full charge capacity, priority may be shifted to the next battery closest to the top of the stack that is in need of charging, partial or complete, in order to conveniently make the battery packs nearest the top of the stack ready for use. In some use models, a user may simply exchange his or her discharged battery pack for a fully charged battery at a retail location. In other words, a user may pick up a charged battery pack from the top of the stack exchanging it for a discharged battery that is left behind.

Figure 13:
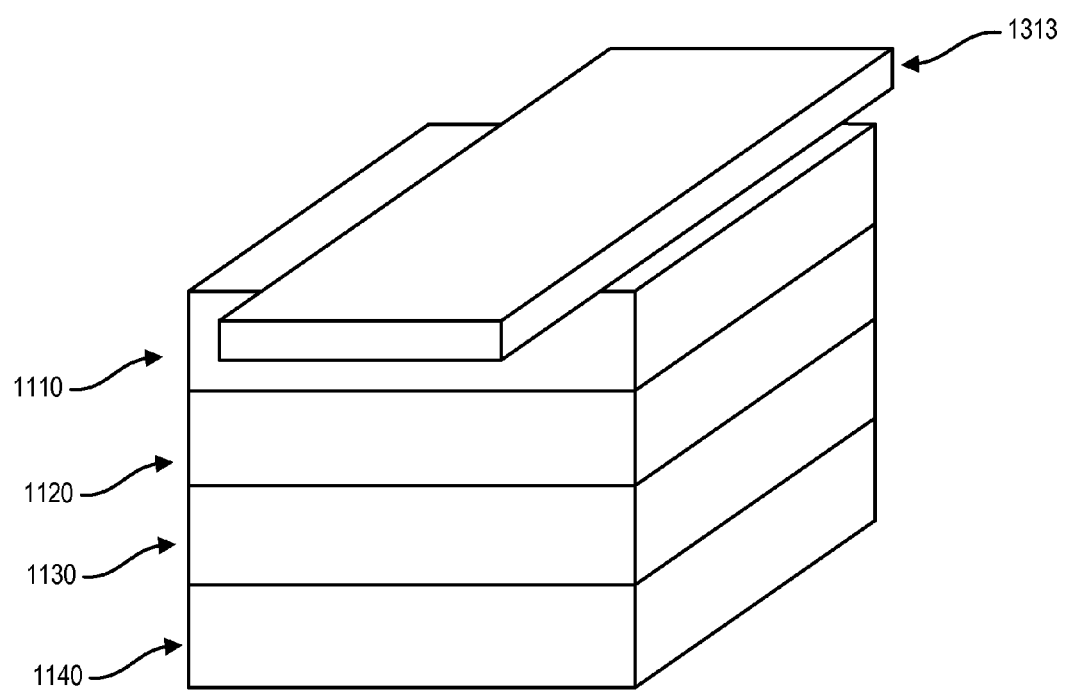
FIG. 13 illustrates stacked battery packs charging an electronic device in accordance with the techniques introduced herein.

FIG. 13 illustrates stacked battery packs 1110-1140 charging electronic device 1313. In FIG. 13, electronic device 1313 is laying on top of battery pack 1110 and being wirelessly charged by or through battery pack 1110. Electronic device 1313 may be a cell phone, smartphone, PDA, tablet computer, phablet, laptop computer, gaming device, GPS receiver, multimedia players, music player, mp3 player, two way radio, video player, and/or another battery powered electronic device, including combinations thereof. Similar to the cooperative charging schemes for the battery packs discussed above with respect to FIG. 12, discharging of the battery packs may also occur in a cooperative or coordinated manner. For example, battery pack 1110 may be discharged or may not be able to supply a sufficient amount of charging current or power to electronic device 1313. Therefore, additional current or power may be supplied to electronic device 1313 by one or more of battery pack 1120-1140. The power may be conducted between any of the battery packs and/or electronic device 1313 through electrical contacts, wired connections, or wireless connections, including combinations thereof.

Figure 14:
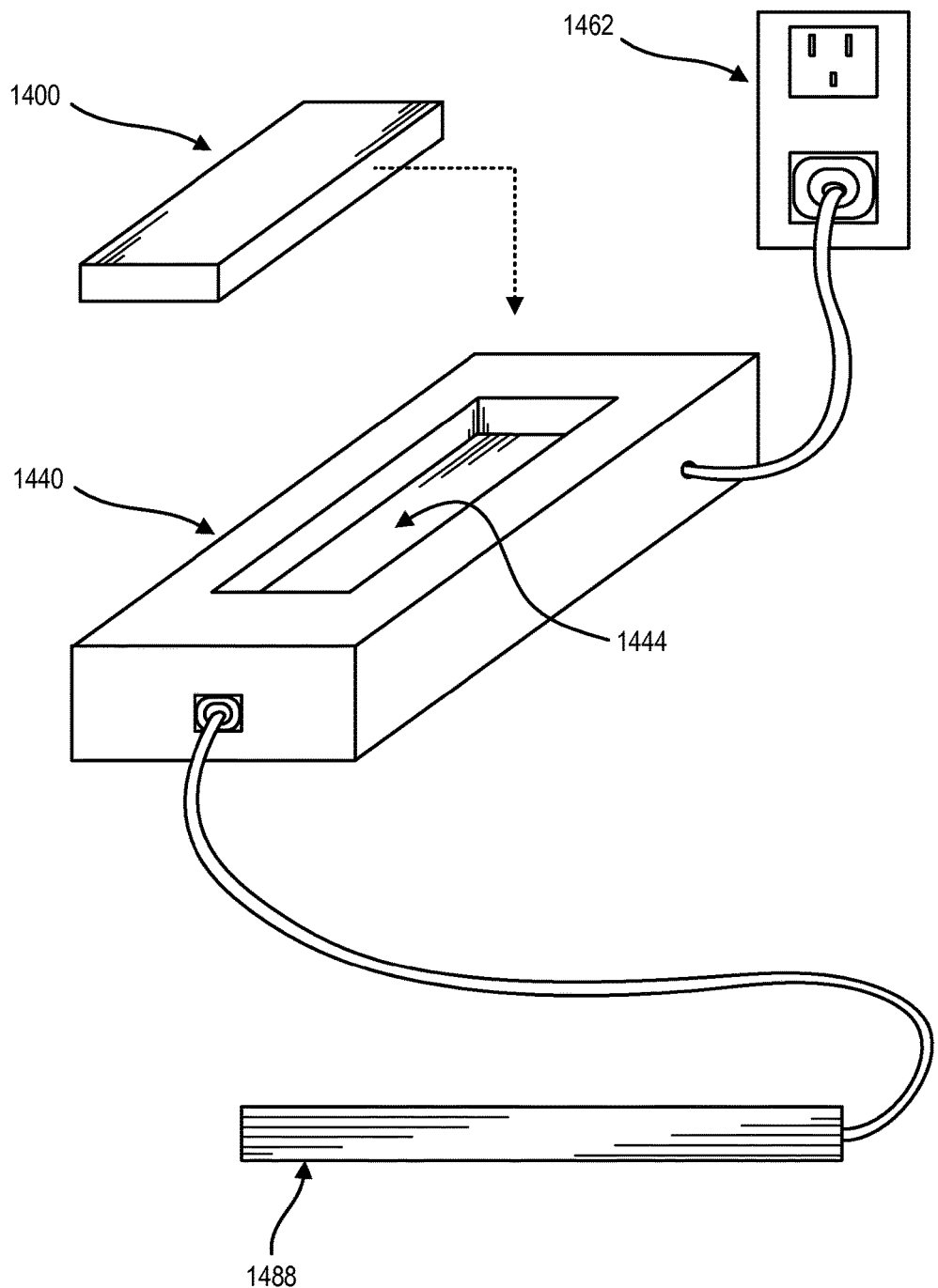
FIG. 14 illustrates a multi-function charger in accordance with the techniques introduced herein.

FIG. 14 illustrates a multi-function charger 1440 in use with battery pack 1400 in accordance with techniques introduced herein. Charger 1440 may be used with a computing device 1488. Computing device 1488 is any type of computer, tablet, or other electronic device which requires electrical power. Computing device 1488 may include a battery that is recharged by charger 1440. However, computing device 1488 may not necessarily be the device with which use of battery pack 1400 is primarily intended. Battery pack 1400 is an example of and may include any of the features, components, or functions of any of the other battery packs disclosed herein.

Charger 1440 provides low voltage charging power to computing device 1488 from a high voltage power source, such as wall outlet 1462. Commonly, wall outlet 1462 provides higher voltage AC power and charger 1440 converts it to lower voltage DC power. Therefore, charger 1440 may also be referred to as an AC adapter, an AC/DC adapter, or an AC/DC converter. In other cases, it charger 1440 may simply be referred to as a power supply even though it is actually receiving the power from an external source such as wall outlet 1462. Other names may include plug pack, plug-in adapter, transformer, adapter block, mains adapter, domestic mains adapter, line power adapter, or power adapter. Although charger 1440 is illustrated in FIG. 14 as being connected to wall outlet 1462 with a cable, charger 1440 may include an integrated electrical plug that mates with wall outlet 1462 such that charger 1440 is attached to wall outlet 1462 by placing it directly next to wall outlet 1462 and engaging the integrated electrical plug with wall outlet 1462. In this configuration, charger 1440 may also be referred to as a "wall wart" because of its appearance relative to the wall when engaged with wall outlet 1462.

Typically a charger such as charger 1440 contains circuitry for converting the supplied AC power to DC power and/or for converting the voltage supplied to charger 1440 to a lower voltage used by computing device 1488. For example, converter 1440 may convert 120V AC power or 240V AC power from wall outlet 1462 to 5V DC or 12V DC power output to computing device 1488.

FIG. 14 also illustrates an alternate or supplemental use of charger 1440, charging battery pack 1400. Although the primary purpose or charger 1440 is to charge or provide power to computing device 1488 it may also provide charging power to battery pack 1400. Because charger 1440 is already configured for producing low voltage and/or DC power to computing device 1488, it can also provide some or all of this power for charging battery pack 1400. Beneficially, charger 1440 becomes a multipurpose charger. Battery 1400 may be charged by charger 1440 by placing battery pack 1400 in cavity 1444 of battery charger 1440. Other alignment or registration tools or techniques may be used including recesses, grooves, tabs, posts, notches, or other similar mechanical alignment features. While a cavity or recess, such as cavity 1444, may be helpful for alignment purposes, it may not be necessary in some configurations. In other words, battery pack 1400 may interface to charger 1440 simply by placing it on or near a surface of charger 1440.

The power provided to battery pack 1400 by charger 1440 may be provided through wired or wireless power transfer. Battery pack 1400 may interface to charger 1440 through electrical contacts, a cable, or through one of the previously described inductive methods of power transfer. Charger 1440 may provide charging power to computing device 1488 and battery pack 1400 simultaneously. Alternatively, charger 1440 may provide power to only one or the other at any given time. In addition, data communications may occur between battery pack 1400 and charger 1440 in order to start charging, stop charging, establish charging parameters, indicate a charging protocol, select charging voltages, select charging currents, and/or communicate other information associated with the charging of battery pack 1400 by charger 1440. In some cases, charger 1440 may charge battery pack 1400 with a different voltage or current level than is used to charge computing device 1488. Beneficially, charger 1440 may be used for charging another device, such as battery pack 1400, in addition to its primary purpose of charging computing device 1488 thereby eliminating the need to have or carry another charger for battery pack 1400.

In one variation, charger 1440 may charge multiple battery packs, such as battery pack 1400, simultaneously. In a further variation, multiple battery packs may be attached to or stacked on charger 1440 and charged in a coordinated manner and/or according to one or more charging schemes or algorithms using techniques similar to those discussed with respect to FIGS. 11-13.

Some or all of the steps and operations associated with the techniques introduced here may be performed by hardware components or may be embodied in non-transitory machine-executable instructions that cause one or more computer processors programmed with the instructions to perform the steps. Alternatively, the steps may be performed by a combination of hardware, software, and/or firmware.

The apparatuses, systems, methods, techniques, and components described herein are meant to exemplify some types of possibilities. In no way should the aforementioned examples limit the scope of the invention, as they are only exemplary embodiments.

The foregoing disclosure has been presented for purposes of illustration and description. Other modifications and variations may be possible in view of the above teachings. The examples described in the foregoing disclosure were chosen to explain the principles of the concept and its practical application to enable others skilled in the art to best utilize the invention. It is intended that the claims be construed to include other alternative embodiments of the invention except as limited by the prior art.

The phrases "in some embodiments," "according to some embodiments," "in the embodiments shown," "in other embodiments," "in some examples," "in some cases," "in some situations," "in one configuration," "in another configuration" and the like generally mean that the particular feature, structure, or characteristic following the phrase is included in at least one embodiment of the present invention and/or may be included in more than one embodiment of the present invention. In addition, such phrases do not necessarily refer to the same embodiments or different embodiments.

What is claimed is:

1. A rechargeable battery pack for use with an electronic device having wireless charging features, the rechargeable battery pack comprising:
    a housing having at least a first surface and a second surface;
    one or more rechargeable batteries;
    a first inductive coil proximate the first surface of the housing, the first inductive coil configured for wirelessly receiving electrical power from an external power source;
    electrical circuitry for storing the received electrical power in the one or more rechargeable batteries;
    a second inductive coil proximate the second surface of the housing, the second inductive coil configured for wirelessly transmitting at least a portion of the received electrical power stored in the one or more rechargeable batteries to the electronic device; and
    one or more visual alignment indicators, wherein the one or more visual alignment indicators are controlled by the electrical circuitry to provide a visual indication of a suggested positioning adjustment for the electronic device relative to the second inductive coil to improve an efficiency of the wireless transmitting of the electrical power, wherein the one or more visual alignment indicators comprises four light emitting diodes (LEDs), each of the four LEDs proximate the second surface of the housing and each respectively associated with a direction relative to the housing, wherein the directions have approximately ninety degree relationships to each other in a plane that is approximately parallel to the second surface.

2. The rechargeable battery pack of claim 1 wherein wirelessly receiving the electrical power includes receiving the electrical power through inductive coupling with an inductive coil associated with the external power source.

3. The rechargeable battery pack of claim 1 wherein wirelessly transmitting the electrical power includes transmitting the electrical power using inductive coupling.

4. The rechargeable battery pack of claim 1 wherein wirelessly receiving the electrical power includes receiving the electrical power through resonant inductive coupling with an inductive coil associated with the external power source.

5. The rechargeable battery pack of claim 1 wherein wirelessly transmitting the electrical power includes transmitting the electrical power using resonant inductive coupling.

6. The rechargeable battery pack of claim 1 further comprising a first electrical interface containing first electrical contacts for alternately receiving the electrical power from the external power source through a first cable electrically connected between the first electrical contacts of the first electrical interface and the external power source.

7. The rechargeable battery pack of claim 6 further comprising a second electrical interface containing second electrical contacts for alternately transmitting the portion of the received electrical power stored in the one or more rechargeable batteries to the electronic device through a second cable electrically connected between the second electrical contacts of the second electrical interface and the electronic device.

8. The rechargeable battery pack of claim 1 wherein the electrical circuitry determines the suggested positioning adjustment based on a detected rate at which the electrical power is being wirelessly transmitted from the one or more rechargeable batteries to the electronic device.

9. The rechargeable battery pack of claim 1 wherein the electrical circuitry is further configured for performing data communications with one or more of the electronic device and the external power source.

10. The rechargeable battery pack of claim 9 wherein a charge status of the rechargeable battery pack is determined based on a ratio of a current charge level of the one or more batteries and a total charge capacity of the one or more batteries.

11. The rechargeable battery pack of claim 1 wherein the housing is waterproof and protects the electrical circuitry, the first inductive coil, the second inductive coil, and the rechargeable batteries from water or moisture.

12. The rechargeable battery pack of claim 1 further comprising a wireless communication module for wirelessly communicating data to one or more of the electronic device and the external power source.

13. A portable rechargeable power pack for charging electronic devices, the portable rechargeable power pack comprising:
- a protective shell;
- a rechargeable power cell in the protective shell;
- a first electrical coil inside the protective shell and proximate a first surface of the protective shell for inductively receiving electrical power from an external electrical power source;
- a power management circuit configured to receive the electrical power from the first electrical coil and to store the electrical power in the rechargeable power cell;
- a second electrical coil inside the protective shell and proximate a second surface of the protective shell for inductively transferring a portion of the electrical power stored in the rechargeable power cell to a receiving device that is external to the housing;
- at least one visual alignment indicator configured to provide a visual indication to a user of the portable rechargeable battery pack, the visual indication including one or more suggested positioning adjustments for the electronic device relative to the second inductive coil to improve an efficiency of the transfer of the electrical power to the receiving device, wherein the at least one visual alignment indicator comprises four light emitting diodes (LEDs), each of the four LEDs proximate the second surface of the protective shell and each respectively associated with a direction relative to the protective shell, wherein the directions have approximately ninety degree relationships to each other in a plane that is approximately parallel to the second surface; and
- a wireless communication module for exchanging data communications with the receiving device for controlling the transfer of the electrical power to the receiving device.

14. The portable rechargeable power pack of claim 13 wherein the protective shell is waterproof.

15. The portable rechargeable power pack of claim 13 wherein one or more of the inductively receiving and the inductively transferring include magnetic resonant coupling.

16. The portable rechargeable power pack of claim 13 wherein the wireless communication module includes a wireless transceiver.

17. A rechargeable battery pack comprising:
- a housing;
- a wireless communication module inside the housing;
- a rechargeable battery inside the housing;
- an inductive electrical coil inside the housing; and
- electrical circuitry electrically connected to the rechargeable battery, the inductive electrical coil, and the wireless communication module, the electrical circuitry configured to:
  - in a first time period, receive electrical power from an external power source, wherein the electrical power is inductively coupled from the external power source to the inductive electrical coil through the housing, and store the received electrical power in the rechargeable battery; and
  - in a second time period, receive a communication from an external electronic device at the wireless communication module and inductively couple at least a portion of the stored electrical power to the external electronic device through the housing using the inductive electrical coil in response to receiving the communication.

18. The rechargeable battery pack of claim 17 wherein the communication and the inductive coupling of the electrical power to the external electronic device are performed in compliance with an industry standard for wireless charging.

* * * * *